US012064961B2

(12) United States Patent
Ukai et al.

(10) Patent No.: US 12,064,961 B2
(45) Date of Patent: Aug. 20, 2024

(54) PRINT DEVICE HAVING HALF CUTTER CUTTING THROUGH RELEASE MATERIAL OF TAPE WITHOUT CUTTING THROUGH BASE MATERIAL BONDED TO THE RELEASE MATERIAL

(71) Applicant: BROTHER KOGYO KABUSHIKI KAISHA, Nagoya (JP)

(72) Inventors: Shinji Ukai, Kiyosu (JP); Hiromitsu Mizutani, Ichinomiya (JP); Kentaro Murayama, Kasugai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 90 days.

(21) Appl. No.: 17/733,444

(22) Filed: Apr. 29, 2022

(65) Prior Publication Data

US 2022/0258499 A1 Aug. 18, 2022

Related U.S. Application Data

(63) Continuation of application No. PCT/JP2020/034872, filed on Sep. 15, 2020.

(30) Foreign Application Priority Data

Nov. 8, 2019 (JP) ................................ 2019-203470

(51) Int. Cl.
*B41J 11/66* (2006.01)
*B41J 3/407* (2006.01)
(Continued)

(52) U.S. Cl.
CPC ........... *B41J 11/663* (2013.01); *B41J 3/4075* (2013.01); *B41J 11/70* (2013.01); *B41J 3/44* (2013.01);
(Continued)

(58) Field of Classification Search
CPC ........ B41J 11/663; B41J 3/4075; B41J 11/70; B41J 11/666; B41J 29/00; B41J 3/44; B41J 11/66; B41J 29/393
See application file for complete search history.

(56) References Cited

U.S. PATENT DOCUMENTS

| | | | |
|---|---|---|---|
| 5,066,152 | A | 11/1991 | Kuzuya et al. |
| 2004/0189733 | A1 | 9/2004 | Yamamoto et al. |

(Continued)

FOREIGN PATENT DOCUMENTS

| | | | |
|---|---|---|---|
| CN | 107405933 | A | 11/2017 |
| CN | 107921795 | A | 4/2018 |

(Continued)

OTHER PUBLICATIONS

Office Action issued in Japanese Patent Application No. 2019-203470 dated Jul. 6, 2023.

(Continued)

*Primary Examiner* — Henok D Legesse
(74) *Attorney, Agent, or Firm* — KENEALY VAIDYA LLP

(57) ABSTRACT

In a print device, the conveyance member conveys a tape on which printing is performed. The tape has a base material and a release material bonded together. The tape includes a print portion on which an image is printed by the head. The printed tape is used to create a printed matter. The half cutter performs a half cut to cut through the release material without cutting through the base material. The full cutter performs a full cut to cut through the tape conveyed by the conveyance member. The controller controls the half cut so that the half cutter cuts through the release material at a position downstream side of a most downstream end of the (Continued)

print portion of the printed tape, which is conveyed by the conveyance member and is printed by the head, in a conveying direction of the tape.

23 Claims, 19 Drawing Sheets

(51) Int. Cl.

| | |
|---|---|
| ***B41J 11/70*** | (2006.01) |
| *B41J 3/44* | (2006.01) |
| *B41J 29/00* | (2006.01) |
| *B41J 29/393* | (2006.01) |

(52) U.S. Cl.
CPC ............... *B41J 11/66* (2013.01); *B41J 11/666* (2013.01); *B41J 29/00* (2013.01); *B41J 29/393* (2013.01)

(56) References Cited

U.S. PATENT DOCUMENTS

| | | | | |
|---|---|---|---|---|
| 2004/0208682 | A1* | 10/2004 | Akaiwa .................. | B41J 11/003 400/613 |
| 2015/0251464 | A1 | 9/2015 | Kubota et al. | |
| 2015/0375527 | A1 | 12/2015 | Torii | |
| 2018/0015742 | A1 | 1/2018 | Inoue et al. | |
| 2018/0056676 | A1 | 3/2018 | Kajihara | |

FOREIGN PATENT DOCUMENTS

| | | | |
|---|---|---|---|
| JP | H01-085050 | U | 6/1989 |
| JP | 2004-216833 | A | 8/2004 |
| JP | 2004-299177 | A | 10/2004 |
| JP | 2006-264030 | A | 10/2006 |
| JP | 2006-264031 | A | 10/2006 |
| JP | 2012-096366 | A | 5/2012 |
| JP | 2012-116084 | A | 6/2012 |
| JP | 2015-066894 | A | 4/2015 |
| JP | 2015-169731 | A | 9/2015 |
| JP | 2016-010932 | A | 1/2016 |
| JP | 2016-168740 | A | 9/2016 |
| JP | 2016-175371 | A | 10/2016 |
| WO | 2021/090580 | A1 | 5/2021 |

OTHER PUBLICATIONS

Office Action issued Mar. 11, 2023 to Chinese Patent Application No. 202080075627.7 (with English translation).

International Preliminary Report on Patentability for PCT/JP2020/034872 dated May 10, 2022.

International Search Report and Written Opinion of the International Search Report for PCT/JP2020/034872 dated Nov. 2, 2020.

* cited by examiner

PRINT DEVICE HAVING HALF CUTTER CUTTING THROUGH RELEASE MATERIAL OF TAPE WITHOUT CUTTING THROUGH BASE MATERIAL BONDED TO THE RELEASE MATERIAL

CROSS REFERENCE TO RELATED APPLICATION

This application is a by-pass continuation application of International Application No. PCT/JP2020/034872 filed Sep. 15, 2020 claiming priority from Japanese Patent Application No. 2019-203470 filed Nov. 8, 2019. The entire contents of the international application and the priority application are incorporated herein by reference.

BACKGROUND

In a conventional technology, a printed label created by printing on printing tape can be wrapped around a cable for use as a cable marking label. In this application, the release paper of the printed label is peeled off to expose an adhesive layer, and the adhesive layer is affixed to the cable so that the printed label is wrapped around the cable.

SUMMARY

In the conventional technology described above, the entire printed label is wrapped around and affixed to the outer circumferential surface of the cable. However, the user may also wish to attach labels to cables in a freely wound state by forming the overall print label in a substantially annular shape and bonding the circumferential ends together so that a print label is rotatable about the cable. In addition to print labels having a substantial annular shape, the user may wish to create print labels having various other forms of use, such as print labels formed by overlapping and bonding together the adhesive parts on both circumferential end portions of the label to form a flag-like shape or print labels used as tags by affixing one end of the label to the flat surface of an adherend. However, the flexibility for creating print labels with such diverse forms of use has not been achievable with a single printing device in the conventional technology.

In view of the foregoing, it is an object of the present disclosure to provide a printing device capable of creating printed matter adaptable to the various needs of users.

In order to attain the above and other objects, one aspect of the disclosure provides a print device. The print device includes a head, a conveyance member, a half cutter, a full cutter, and a controller. The head is configured to perform printing. The conveyance member is configured to convey a tape on which the printing by the head is performed. The tape has a base material and a release material bonded together. The tape includes a print portion on which an image is printed by the head. The printed tape is used to create a printed matter. The half cutter is configured to perform a half cut to cut through the release material in a width direction without cutting through the base material. The full cutter is configured to perform a full cut to cut through the tape conveyed by the conveyance member. The controller is configured to control the conveyance member, the head, the half cutter, and the full cutter. The controller is configured to control the half cut so that the half cutter cuts through the release material at a position downstream side of a most downstream end of the print portion of the printed tape, which is conveyed by the conveyance member and is printed by the head, in a conveying direction of the tape. According to the configuration, the part of the release material downstream side of the position of the half cut can be released, and thus the printed matter can be used in various ways according to the user's need.

BRIEF DESCRIPTION OF THE DRAWINGS

The particular features and advantages of the disclosure as well as other objects will become apparent from the following description taken in connection with the accompanying drawings, in which.

DETAILED DESCRIPTION

An embodiment of the present disclosure will be described while referring to FIGS. 1-17.

Label-Creating Device

First, the functional configuration of a label-creating device 1 will be described with reference to FIG. 1. The label-creating device 1 constitutes the printing device of the present embodiment.

Figure 1:
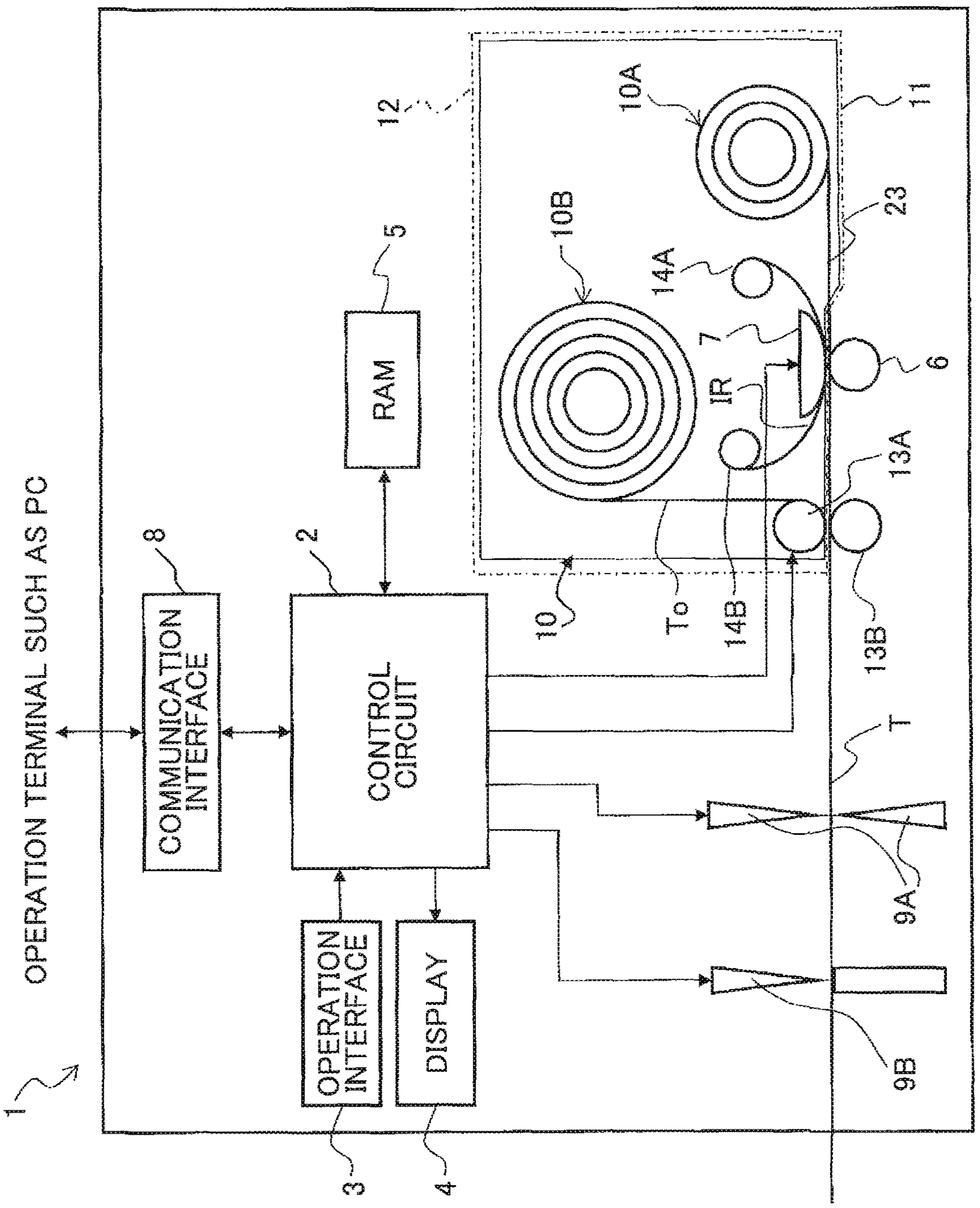
FIG. 1 is an explanatory diagram illustrating functional configuration of a label-creating device.

As shown in FIG. 1, the label-creating device 1 (corresponding to the printing device) has a control circuit 2, an operation interface 3 on which the user (operator) can perform desired operations, a display 4 for displaying various types of information, a RAM 5 for storing various types of information, a conveying roller 6, a print head 7, a communication interface 8 for exchanging information with an external operation terminal, a full cutter 9A, and a half cutter 9B. Of these, the operation interface 3 and the communication interface 8 respectively are examples of the first input interface and second input interface.

A cartridge holder 12 is also provided in the label-creating device 1. A tape cartridge 10 is detachably mounted in the cartridge holder 12. The tape cartridge 10 has a case 11 that accommodates tape rolls 10A and 10B. Note that the tape rolls 10A and 10B are depicted as concentric circles in the drawing for simplification but are actually tape wound into spiral-shaped rolls. A cover film 23 is wound around the tape roll 10A, while a tape To is wound around the tape roll 10B. The tape To includes a plurality of layers. The layered structures and the like of the cover film 23 and the tape To will be described later.

The control circuit 2 (corresponding to the controller) is provided with a CPU and a ROM not shown in the drawings. The control circuit 2 executes various programs pre-stored in the ROM while utilizing the temporary storage function of the RAM 5 while performing overall control of the label-creating device 1. In the present embodiment, the ROM of the control circuit 2 stores a processing program for directing the CPU of the control circuit 2 to execute various procedures in the flowcharts of FIGS. 14, 15, 16, and 17 described later. The control circuit 2 also exchanges various commands and information with an external operation terminal (not shown) via the communication interface 8. Various information terminals such as a personal computer, a smartphone, or a tablet computer, may be employed as the operation terminal, and the mode of communication employed by the operation terminal may be wired or wireless communication.

The conveying roller 6 (corresponding to the conveyance member) is disposed in opposition to the print head 7. The cover film 23 paid out from the tape roll 10A is transparent and is interposed between the conveying roller 6 and the print head 7. Note that "transparent" in this specification is a concept that represents a property of transparency of a degree that enables humans to distinguish printed content and includes the meaning "translucency" and the like.

The tape cartridge 10 is also provided with an ink ribbon supply roll 14A, and an ink ribbon take-up roll 14B. An ink ribbon IR is wound around the ink ribbon supply roll 14A. The ink ribbon IR paid out from the ink ribbon supply roll 14A is taken up by the ink ribbon take-up roll 14B. The print head 7 (corresponding to the head member) prints by transferring ink from the ink ribbon IR paid off the ink ribbon supply roll 14A onto the cover film 23 as the cover film 23 is conveyed by the conveying roller 6.

In the configuration described above, first the tape cartridge 10 is mounted in the cartridge holder 12. Subsequently, the print head 7 forms (hereinafter called "prints" for convenience) desired print objects specified by the user, such as characters and icons (referred to as the "print image R" described later) on the cover film. 23 drawn off the tape roll 10A by the rotation of the conveying roller 6. After print objects have been formed on the cover film 23, the cover film 23 is interposed between pressure rollers 13A and 13B (corresponding to the conveyance member and the bonding member) together with the tape To paid out from the tape roll 10B. The pressure rollers 13A and 13B compress the cover film 23 with the tape To to faun a printed tape T. Subsequently, the control circuit 2 actuates the full cutter 9A under cooperative control with the conveying roller 6 in order to cut the printed tape T at a desired position in the tape length direction, thereby producing a print label L (corresponding to the printed matter). Differences in the cutting modes of the full cutter 9A and the half cutter 9B will be described later in detail.

Basic Structure of the Tape

Figure 2A:
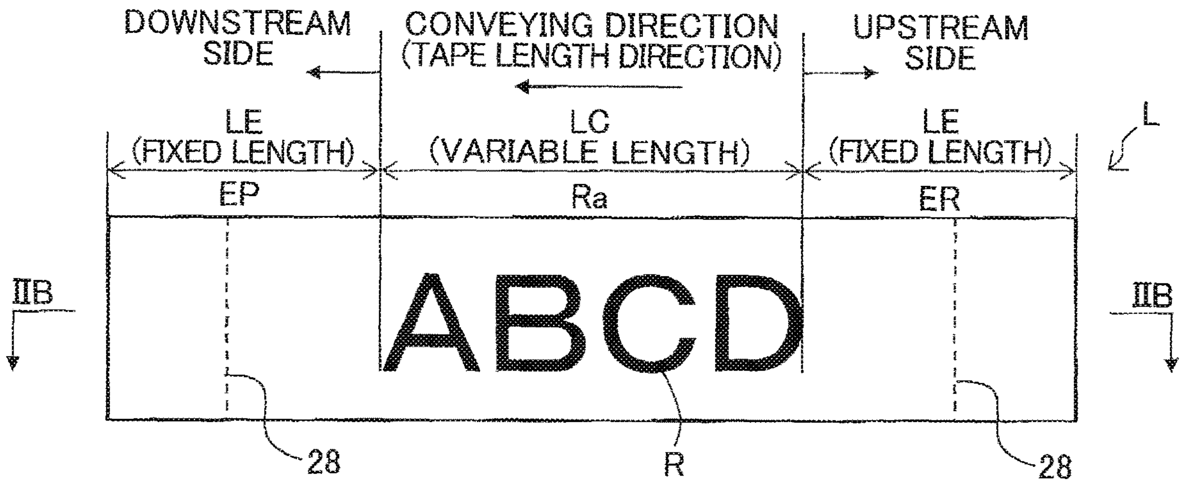
FIG. 2A is a planer diagram of a print label.
Figure 2B:
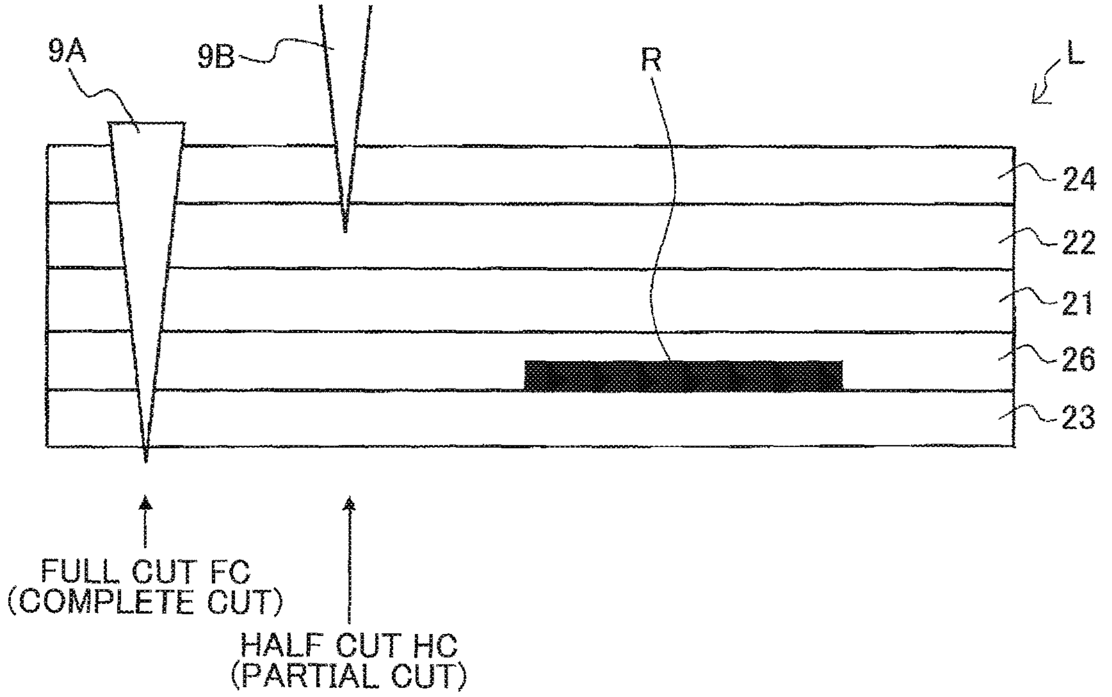
FIG. 2B is a side cross section of the print label taken along a plane IIB-IIB shown in FIG. 2A.

FIGS. 2A and 2B show detailed configurations of the tape To and the printed tape T described above. FIG. 2A is a plan view of the printed tape T from the side of the cover film 23, and FIG. 2B is a cross-sectional view of the printed tape T taken along the plane IIb-IIb. The tape To shown in FIGS. 2A and 2B is configured of an opaque release layer 24 (corresponding to the release material), a transparent bonding adhesive layer 22, a transparent base layer 21 (corresponding to the base material), and a transparent bonding adhesive layer 26 laminated in order from one side in the thickness direction of the tape (the top side in FIG. 2B) toward the other side in the thickness direction (the bottom side in FIG. 2B). Each of these layers 24-23 has constituents such as a paper, a colored film, a fabric, or a metal. In this specification, "opaque" represents a property that prevents humans from recognizing printed content and is a concept that does not include the meaning of "translucent" or the like.

In this example, the print head 7 forms print objects (i.e., the print image R described above) on the cover film 23 as described above. The print object include the text "ABCD". The label-creating device 1 then generates the printed tape T by bonding the printed surface of this cover film 23 to the bonding adhesive layer 26 of the tape To. Thereafter, the full cutter 9A cuts the printed tape T in the width direction at a suitable position in the tape length direction, thereby creating a print label L showing the above described printed text "ABCD" through the transparent cover film 23.

In this case, the full cutter 9A (corresponding to the full cutting member) cuts off the entire printed tape T at the position in the tape length direction by cutting through all layers in the thickness direction of the printed tape T including the release layer 24, the bonding adhesive layer 22, the base layer 21, the bonding adhesive layer 26, and the cover film 23, as illustrated in the enlarged view of FIG. 2B. Hereinafter, this complete cut performed by the full cutter 9A will be called a full cut.

Alternatively, the half cutter 9B described above (corresponding to the half cutting member) performs a half cut in the printed tape T by cutting in the tape width direction through only the release layer 24 in the thickness direction, as illustrated in the enlarged view of FIG. 2B. Making such half cuts in the print label L creates a plurality of release layers 24 which is separated in the tape length direction but still tied via the bonding adhesive layer 22. With this configuration, the user can selectively peel off release layers 24 from the print label L so that the bonding adhesive layer 22 in those areas is exposed as adhesive parts, while areas in which release layers 24 were not peeled off serve as non-adhesive parts.

In the example of this embodiment, a half cut is made at least at one location in the area of the printed tape T downstream of the most downstream section of the printed part in the conveying direction (the left edge of the character "A" in the example of FIG. 2A). According to need, a half cut is also made upstream of the most upstream section of the printed part on the printed tape T in the conveying direction (the right edge of the character "D" in the example of FIG. 2A). Further, a full cut is performed through the printed tape T upstream of the most upstream section of the printed, part in the conveying direction.

The entire region of the print label L in the conveying direction is divided into a print area Ra for the print object (the text "ABCD" in the example of FIG. 2A), a downstream margin EP on the downstream side of the print area Ra, and an upstream margin ER on the upstream side of the print area Ra. In this case, in the above process a half cut is performed in the region of each, of the downstream margin EP and the upstream, margin ER. In this embodiment, a length LC of the print area Ra in the conveying direction is a variable length essentially based on the content of the print object (the number of characters, the size (points) of each character, etc.), while the lengths of the downstream margin EP and the upstream margin ER in the conveying direction are both fixed and set to the same length LE. Below, this symmetrical arrangement of the downstream margin EP and the upstream margin ER viewed along the entire region in the conveying direction of the print label L will be one basic layout rule for printing compositions in the present embodiment.

Detailed Configurations of Print Labels by Type

The label-creating device 1 according to the present embodiment can create print labels L of three different types (Types A. B, and C) according to the various needs of users. The types of print labels L have different layouts and configurations of print content and various cuts according to their form of use. Each of these three Types A, B, and C of print labels L will be individually described below in greater detail.

Detailed Configuration of Type A

Figure 3A:
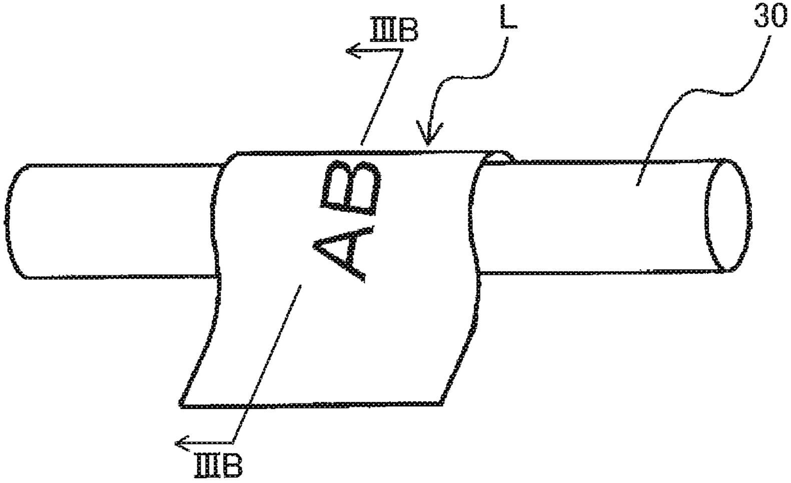
FIG. 3A is a perspective view showing an appearance of a Type A print label in its state of use.
Figure 3B:
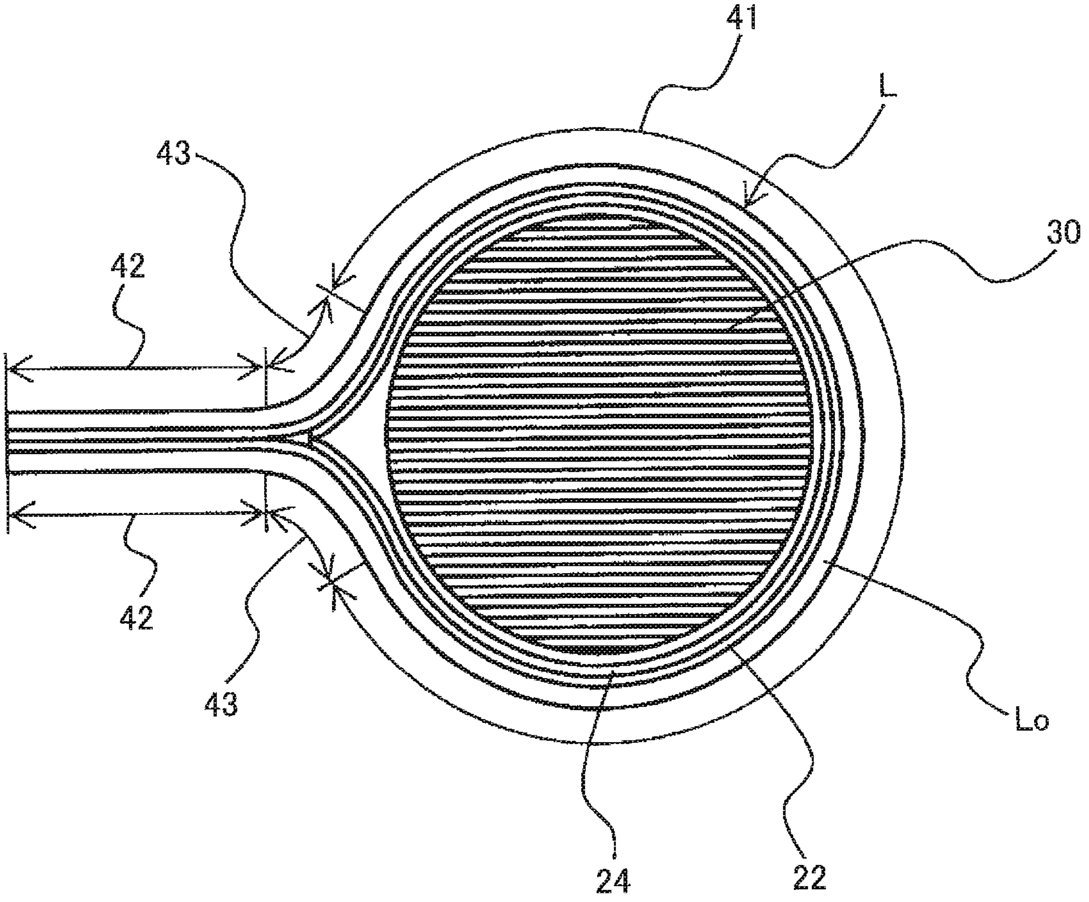
FIG. 3B is a cross section of the Type A print label taken along a plane IIIB-IIIB shown in FIG. 3A.

FIGS. 3A and 3B illustrate a sample application of the Type A print label L. FIG. 3A is a perspective view showing the appearance of a Type A print label L in its state of use. FIG. 3B is a cross-sectional view of the print label L in its state of use taken along the plane IIIB-IIIB in FIG. 3A. To avoid a complex depiction in FIG. 3B, the base layer 21, the bonding adhesive layer 26, and the cover film 23 in the print label L are depicted integrally as a label body Lo, while the remaining release layer 24 and the bonding adhesive layer 22 are depicted separately. (This method of depiction is also used in subsequent drawings.)

As shown in FIGS. 3A and 3B, the Type A print label L is attached for a cable-like adherend 30. Specifically, the print label L is wrapped once around the adherend 30 to form a substantially annular shape, and the bonding adhesive layer 22 on both ends of the print label L in the conveying direction are subsequently bonded together to form an overall flag-like shape.

In this application, the Type A print label L can be divided functionally into three segments: a wrapped part 41 wrapped around the outside of the adherend 30; extended parts 42 extending in a radial direction of the adherend 30; and connecting parts 43 connecting the wrapped part 41 to the extended parts 42. In other words, two areas of the release layer 24 having the same length, which correspond to the two extended part 42 and is positioned on both ends of the overall print label L in the tape length direction, are only peeled off from the bonding adhesive layer 22 (or the label body Lo), and the two adhesive parts on the exposed areas of the bonding adhesive layer 22 are bonded together to form the extended parts 42 extending in a radial direction of the adherend 30. Further, since the wrapped part 41 and the connecting parts 43 that contact the outer circumferential surface of the cable-like adherend 30 are non-adhesive parts that remain, covered by the release layer 24, the overall print label L constitutes rotatable printed matter that can freely rotate relative to the outer circumferential surface of the adherend 30.

In order to avoid localized damage from folds in the print label L itself, the two connecting parts 43 rise slightly off and separate from the outer circumferential surface of the adherend 30 at the same appropriate radius of curvature before connecting to the extended parts 42. Further, the print object are generally printed only within the range of the wrapped part 41 and the connecting parts 43. Accordingly, in the following description, the symmetrical layout of the two extended parts 42 on both ends of the print label L when viewed along the entire region in the conveying direction constitutes one fundamental layout rule for functional configurations in the present embodiment.

Figure 4:
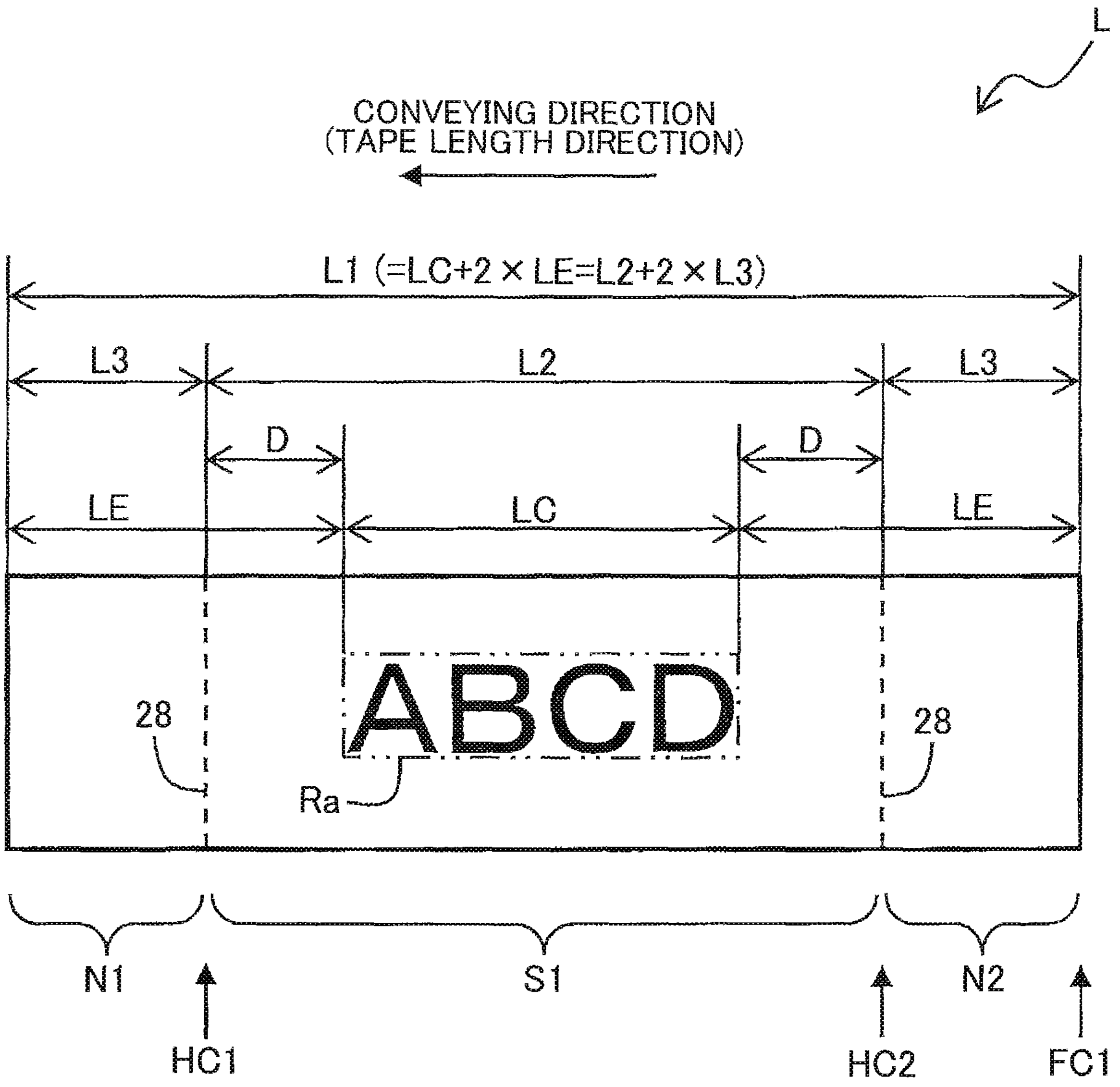
FIG. 4 is a planer diagram showing layout configuration of print content and various cuts of the Type A print label.

FIG. 4 illustrates a layout configuration of print content and various cuts on this Type A print label L. In general, values for dimensions described below in the examples of the drawings and specification are given in units of mm unless otherwise specified.

Based on the layout rules in the printing configuration shown in FIG. 2A described above, the print label L has an overall length L1 in the conveying direction found by taking the sum of the length LC for the print area and the length LE of each margin arranged on the two ends, as given in the following equation Eq. 1.

$$L1=LC+2\times LE \quad \text{(Eq. 1)}$$

This overall length L1 is an example of the dimension of the printed matter in the tape length direction.

On the other hand, based on the layout rules in the functional configuration for the Type A print label L shown in FIG. 3B, the overall length L1 of the print label L in the conveying direction is found by taking the sum of a length L2 for the entire non-adhesive part S1 which includes the wrapped part 41 arranged in the center and the connecting parts 43 on both ends of the wrapped part 41 (a distance between end boundaries, as will be described later), and lengths L3 for the adhesive parts N1 and N2 on the extended parts 42 arranged on the two ends of the print label L, as given in the following equation Eq. 2.

$$L1=L2+2\times L3 \quad \text{(Eq. 2)}$$

This length L3 is an example of the distance between the half cut location and the full cut location.

Here, the non-adhesive part S1 arranged in the center of the print label L is divided from the adhesive parts N1 and N2 adjacent to the ends of the non-adhesive part S1 by two half cut lines 28 (depicted by dashed lines in the drawing) formed by the half cutter 9B. The interval between these two half cut lines 28, which constitutes the boundaries with the extended parts 42 on the two ends of the print label L in the conveying direction, is defined as the distance L2 between end boundaries. This distance L2 between end boundaries is an example of the distance between the two half cut positions and the distance between two adjacent half cut positions with no intervening full cut location.

Further, the full cutter 9A may perform a full cut. For a Type A print label L, only one full cut F1 need be made on the most upstream end of the print label L a distance equivalent to the length L1 from the most downstream end. In the following description, the half cuts HC1 and HC2 and the full cut FC1 are designated with the sequential reference numbers HC1, HC2, and FC1 based on their order of formation, i.e., their order from the downstream side toward the upstream side of the conveying direction. The adhesive parts and the non-adhesive parts are similarly assigned the sequential reference numbers N1, S1, and N2 in their order of formation. In the following description, unique sequential reference numbers are assigned for different types and variations.

Here, since the margin length LE on each of the two ends is set to a fixed length as described above, the overall length L1 of the print label L is fundamentally dependent on the length LC of the print area (i.e., the length of the print object), which is a variable length set by the user. On the other hand, the distance L2 between end boundaries must be set to a length appropriate for the circumferential length (outer diameter) of the cable, i.e., the adherend 30. Therefore, the print area Ra with the length LC and the non-adhesive part S1 covering the distance L2 between end boundaries are both symmetrically arranged such that their center positions are aligned with the center position of the entire print label L in the conveying direction. Further, in most cases, the ends of both on respective sides are symmetrically offset by a deviation D ((L2−LC)/2).

Figure 5:
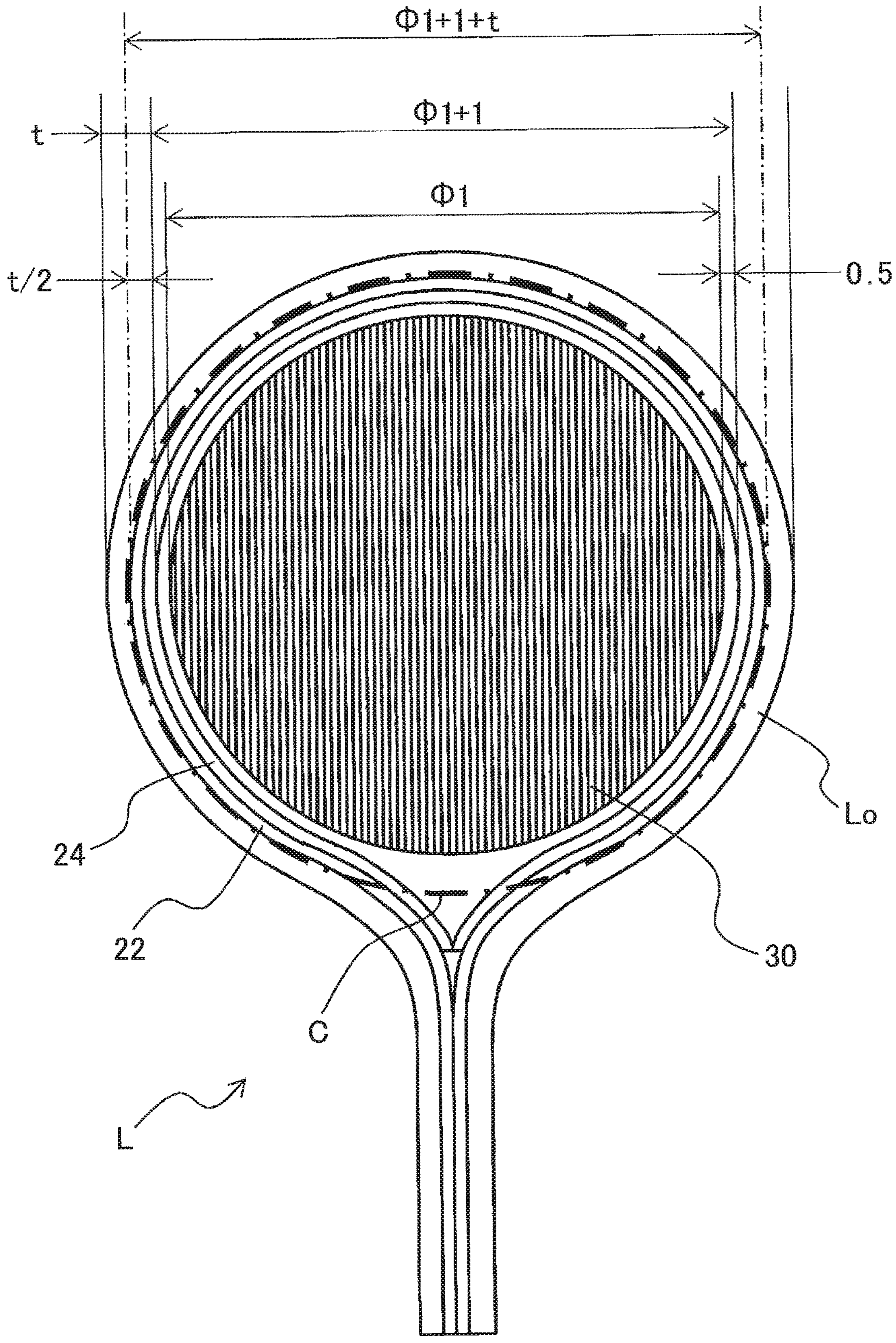
FIG. 5 is an enlarged view of the cross section shown in FIG. 3B illustrating dimension settings for a distance L2 between end boundaries.

FIG. 5 is an enlarged view of FIG. 3B for showing the dimension setting for the distance L2 between end boundaries in a Type A print label L. When the outer diameter of a cable-like adherend 30 is called ϕ1 (corresponding to the adherend-related information), the inner diameter of the wrapped part 41 is initially set to 1 mm greater than the outer diameter ϕ1 (ϕ1+1; i.e., to ensure a gap of 0.5 mm on each side) so that the print label L will be freely rotatable relative to the outer circumferential of the adherend 30 when wrapped around the adherend 30. This 1-mm dimension is an example of the rotational gap dimension.

Here, for the wrapped part 41 that is wrapped around the adherend 30 at a constant radius of curvature, the inner radial side is compressed while the outer radial side is expanded. However, an equidistance circle C (depicted by a one-dot chain line in FIG. 5) positioned between these sides in the thickness direction (radial direction) may be considered to maintain the same length whether the wrapped part 41 is in its wrapped state or its flattened state prior to being wrapped. When the overall thickness of the print label L in the wrapped part 41 that includes the release layer 24 is called t, the diameter of the equidistance circle C in the wrapped part 41 is (ϕ1+1+t), i.e., an increase of t/2 on one side.

In this example, it will be assumed that the connecting parts 43 add an additional overall length of 1.5 mm (i.e., 0.75 mm on each side). Accordingly, the distance L2 between end boundaries is set to the following length obtained by adding 1.5 mm to the circumferential length of the equidistance circle C.

$$L2=(\phi 1+1+t)\times\pi+1.5 \qquad \text{(Eq. 3)}$$

This dimension of 1.5 mm is an example of the prescribed surplus dimension.

While not expressly shown in the drawings, a method of setting the distance 12 between end boundaries that uses a medium thickness coefficient for the print label L rather than the addition constant described above (1.5 mm) may be employed as the method for incorporating the lengths of the connecting parts 43. That is, as the overall thickness of the print label L increases, the area moment of inertia related to its medium thickness coefficient increases, making the print label L more difficult to bend. Thus, the radius of curvature for the connecting parts 43 must be set larger, resulting in a longer distance L2 between end boundaries. In this case, the distance L2 between end boundaries can be set to the following length, where K is the medium thickness coefficient.

$$L2=(\phi 1+1+t)\times\pi\times K \qquad \text{(Eq. 4)}$$

Note that this medium thickness coefficient K itself may be calculated using a function that has the thickness t as a variable. However, the medium thickness coefficient K may be set to different values for different ranges of the thickness t. For example, the medium thickness coefficient K may be set to 1 when the thickness t is at least 40 μm and less than 100 μm, 1.01 when the thickness t is at least 100 μm and less than 200 μm, and 1.02 when the thickness t is greater than or equal to 200 μm.

Note that in a case that the length LC of the print area exceeds the distance L2 between end boundaries, the distance L2 between end boundaries derived from the physical length of the adherend 30 is used as a reference on a priority basis. Thus, the length LC of the print area is corrected to conform with the distance L2 between end boundaries. In other words, the character size of the print object to be printed or/and the number of characters to be printed is modified to shorten the length LC of the print area so that the print area Ra can fit inside the non-adhesive part S1 (i.e., so that LC≤L2). Further, at least 2.5 mm (and at least 5 mm combined) must be secured for the length L3 of each of the adhesive parts on the ends of the print label L to ensure a firm bond between the extended parts 42 and to facilitate the user in manually peeling the release layers 24 from the adhesive parts N1 and N2. When these lengths cannot be secured, printing cannot be performed, and an error process is executed. This dimension of 5 mm is an example of the prescribed threshold value.

To create this Type A print label L on the label-creating device 1 of the present embodiment described above, a cut position adjustment process is executed prior to creating the print label L in order to adjust layout settings that satisfy all of the above specification conditions, i.e., the layout of the print area Ra, the half cuts HC1 and HC2, and the full cut FC1. Specifically, in the cut position adjustment process for this Type A print label L, the dimensions for the overall length L1 of the print label L, the distance L2 between end boundaries, and the length L3 of the adhesive parts may be calculated based on an arbitrary setting for the length LC of the print area, a fixed setting for the margin length LE, and the outer diameter ϕ1 of the cable-like adherend 30.

Figure 6A:
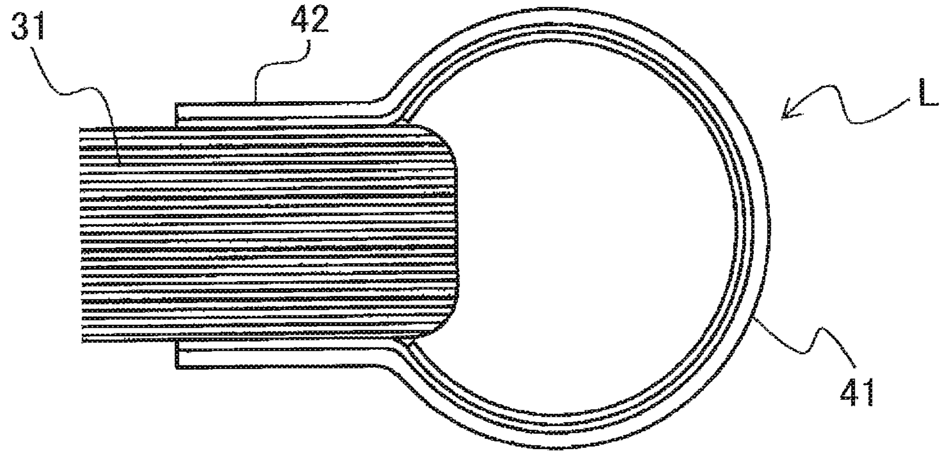
FIGS. 6A-6C are cross sections of the Type A print label illustrating other states of use.
Figure 6B:
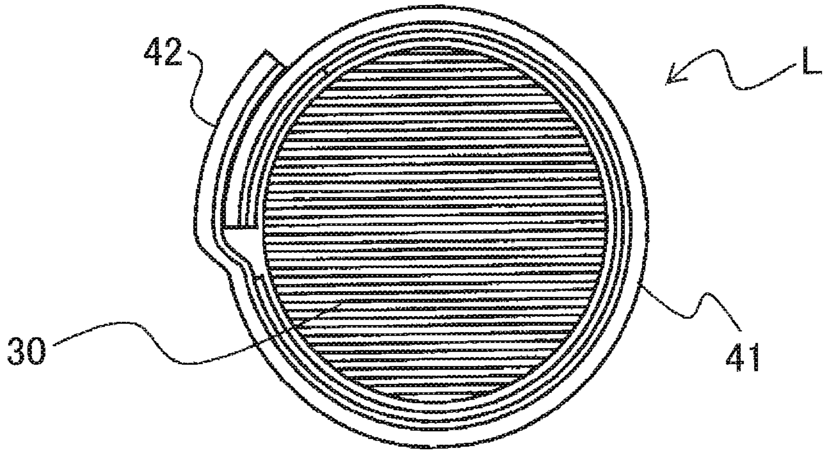
Figure 6C:
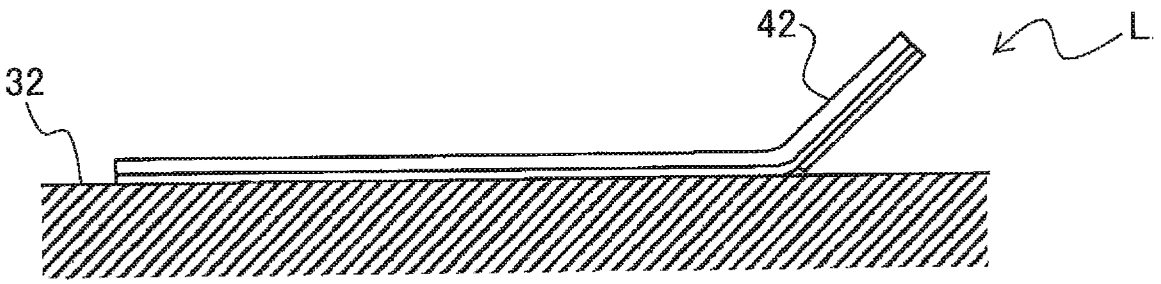

This Type A print label L can be used in various applications other than that shown in FIGS. 3A and 3B. For example, the adherend is not limited to a cable-shaped object. The Type A print label L may be applied to an adherend 31 having a flat plate-like body such as that shown in FIG. 6A. In this case, the print label L is affixed to the adherend 31 so that the adhesive parts in the extended parts 42 are sticked to opposing side surfaces of the adherend 31. FIG. 6B shows another application for this Type A print label L. In this example, the release layer 24 is peeled off in only one of the extended parts 42 to reveal an adhesive part, while the other extended part 42 functions as a non-adhesive part. After wrapping the print label L around a cable-like adherend 30 using the other extended part 42 and the central wrapped part 41, the adhesive part of one extended part 42 is sticked to the top of the wrapped portion. Further, while not shown in the drawings, the release layer 24 may be peeled off in the entire print label L and the print label L may be wrapped around the entire circumference of the adherend 30 and sticked thereto. The Type A print label L may also be used as a tag, as in the example of FIG. 6C. In this case, the release layer 24 is peeled off in each of one extended part 42 and the central wrapped part 41 to form an adhesive part that is sticked to a flat surface of an adherend 32. At this time, the other extended part 42 can rise off the surface of the adherend 32 as a non-adhesive part, enabling the user to easily grip the non-adhesive part to peel the entire print label L off the adherend 32. While not shown in the drawing, the release layer 24 may be peeled off in just one extended part 42 as an alternative, shortening the length of the adhesive part.

Figure 7A:
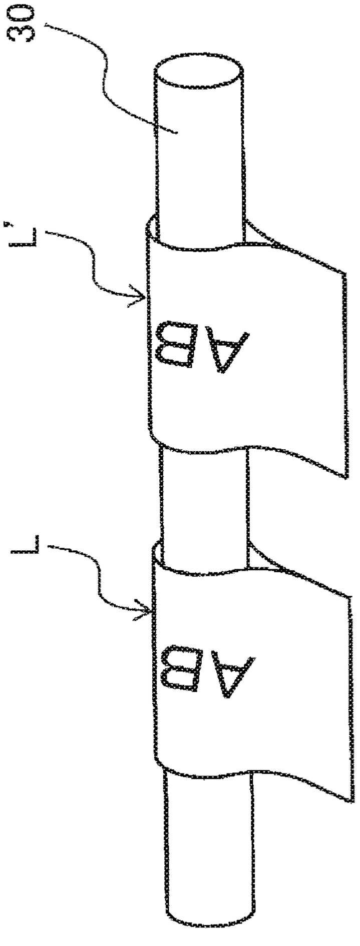
FIG. 7A is a perspective view showing a state of use of two Type A print labels which are successively created.

As shown in the example of FIG. 7A, two of the same Type A print labels L may be created in a multi-label creation mode. In the cut position adjustment process for this case, the overall length L1' of a print label L' created second can be calculated in the same way as the overall length L1 for the first print label L, as follows.

$$L1'=L2+2\times L3 \quad \text{(Eq. 5)}$$

Figure 7B:
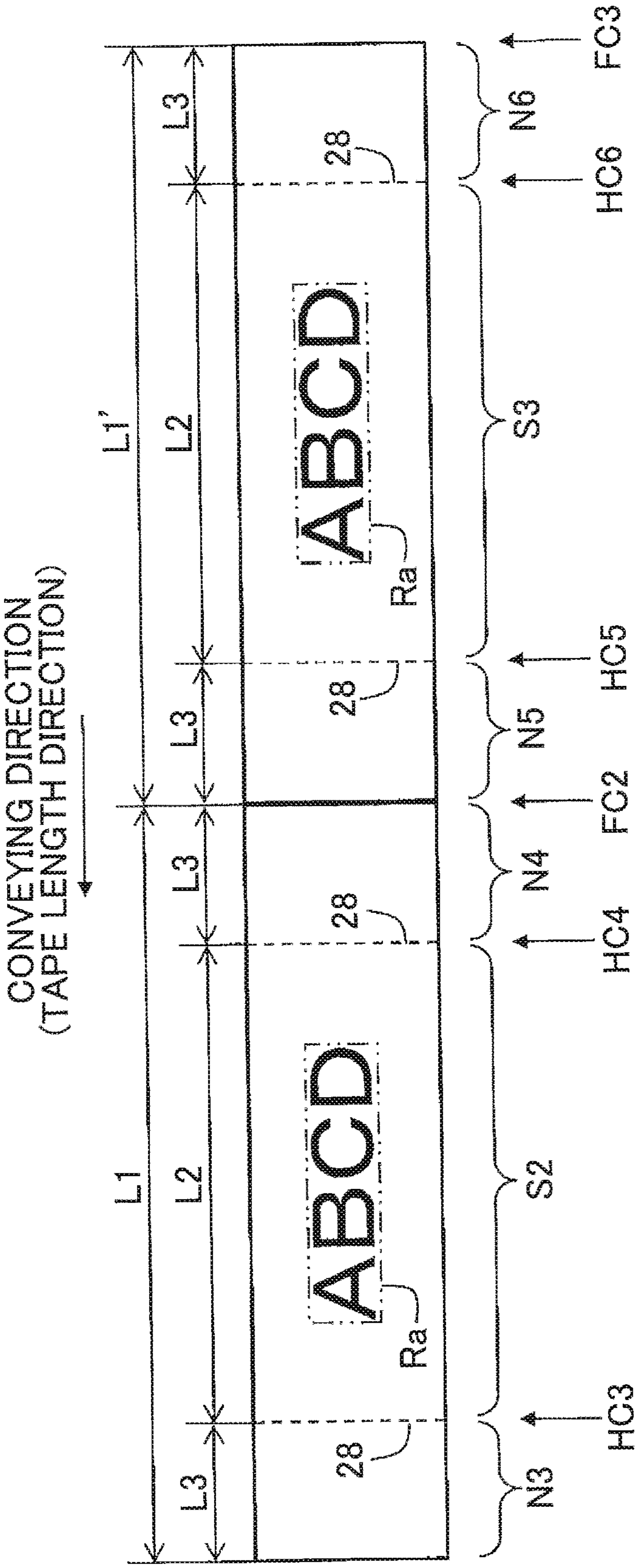
FIG. 7B is a planer diagram showing layout configuration of print content and various cuts of the two Type A print labels.

In this case, by calculating suitable dimensions for the overall length L1 of the print label L, the distance L2 between end boundaries, and the length L3 of the adhesive parts in the cut position adjustment process, each print area Ra, the half cuts HC3, HC4, HC5, and HC6, and the full cuts FC2 and FC3 are arranged on the first and second print labels L and L' as shown in FIG. 7B.

Detailed Configuration of Type B

Figure 8A:
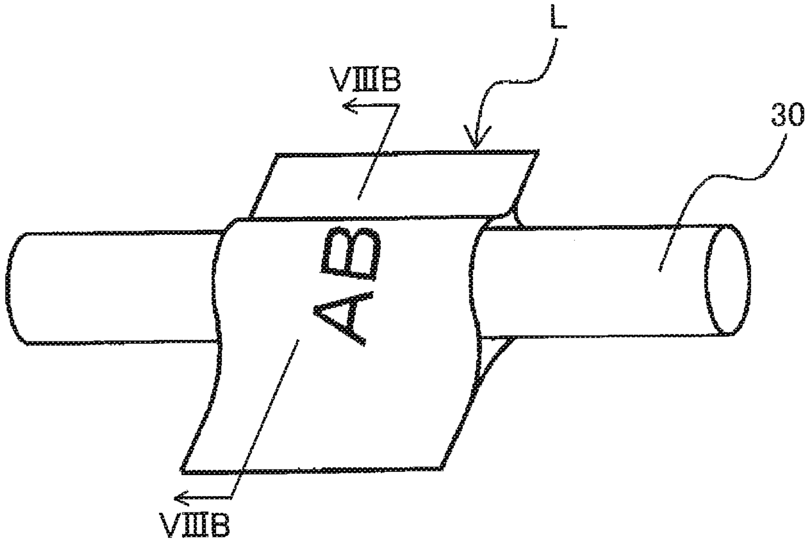
FIG. 8A is a perspective view showing an appearance of a Type B print label in its state of use.
Figure 8B:
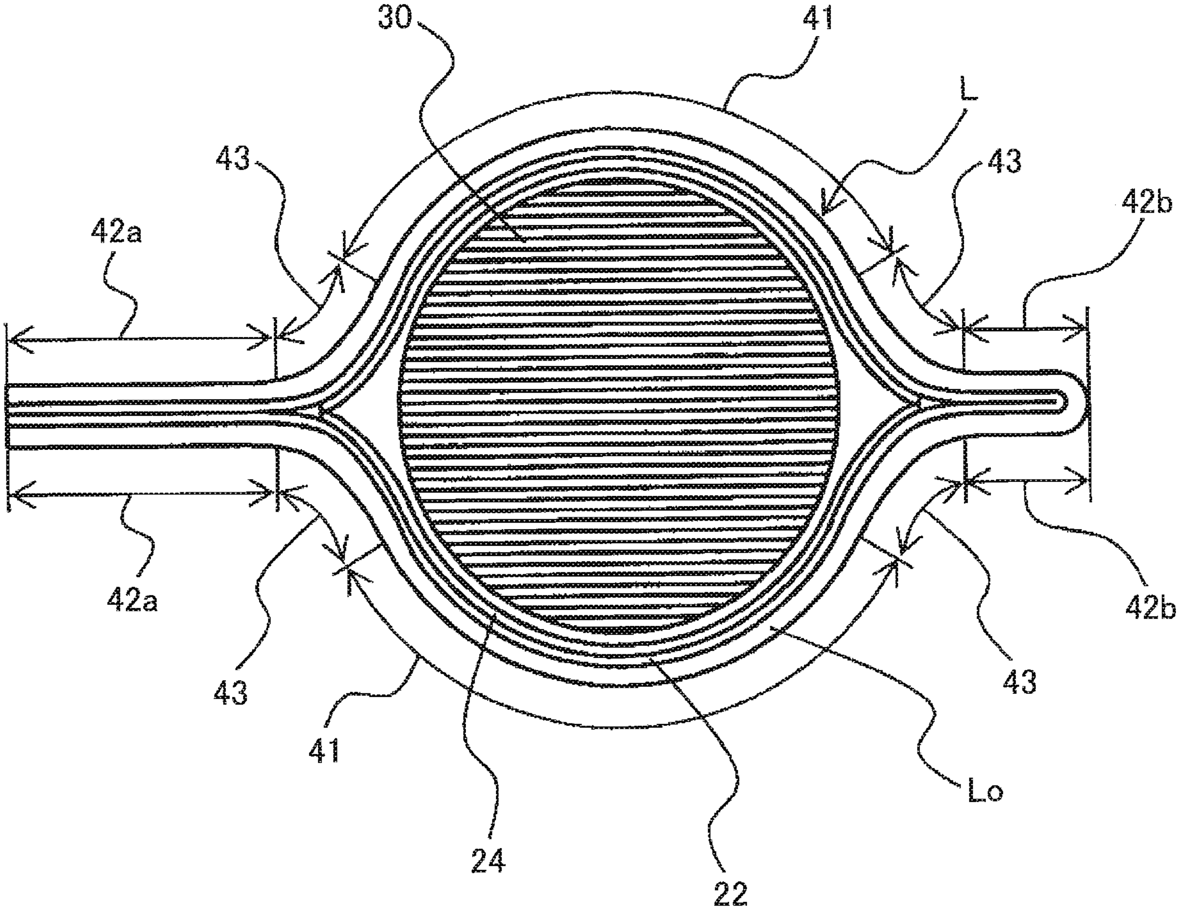
FIG. 8B is a cross section of the type B print label taken along a plane VIIIB-VIIIB shown in FIG. 8A.
Figure 9:
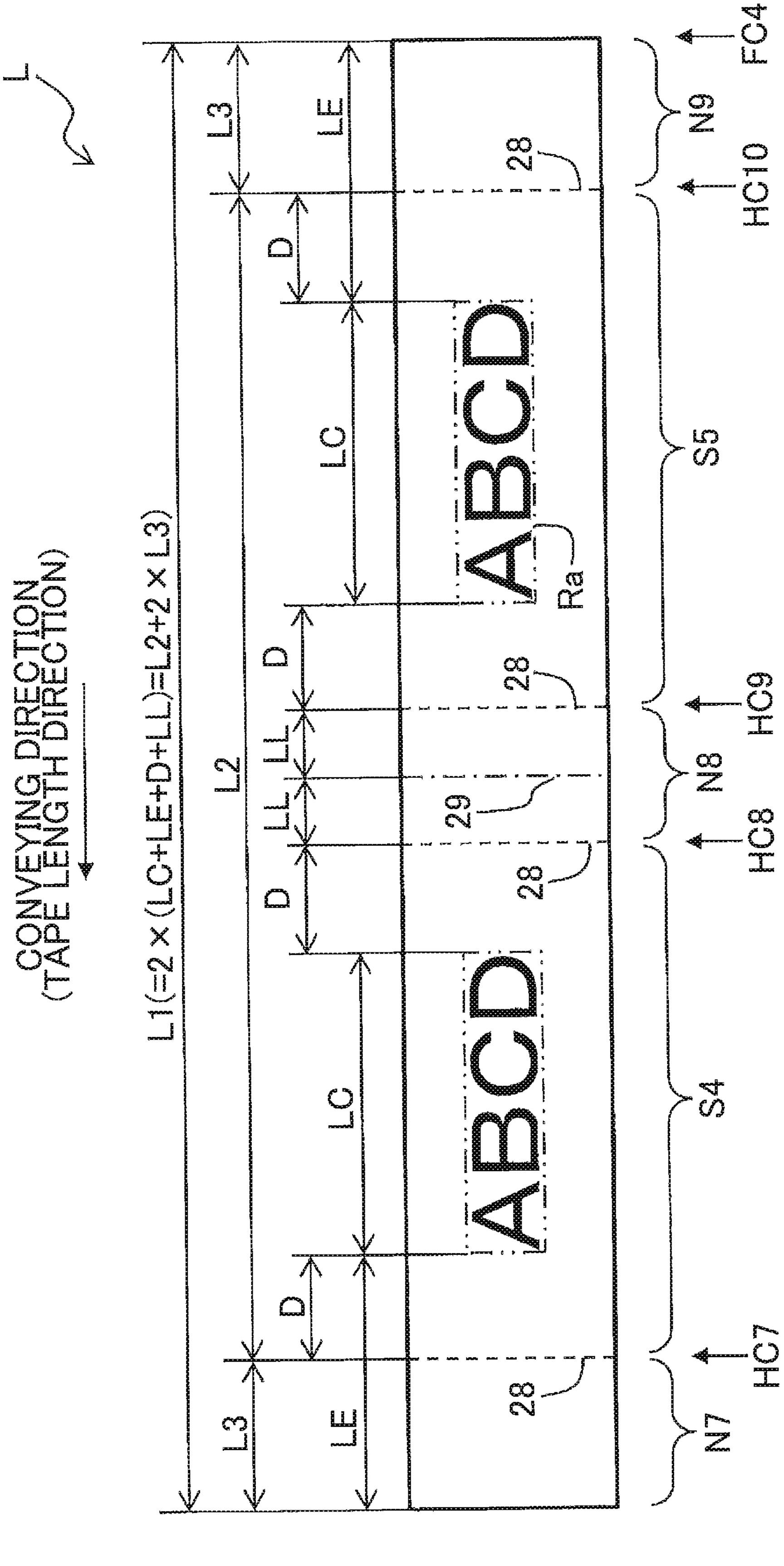
FIG. 9 is a planer diagram showing layout configuration of print content and various cuts of the Type B print label.

FIGS. 8A and 89 show a sample application for the Type B print label L. FIG. 8A is a perspective view showing the appearance of the print label L in this state of use, and FIG. 8B is a cross-sectional view of the plane VIIIB-VIIIB in FIG. 8A. FIG. 9 also shows the layout and configuration of the print content and various cuts in this Type B print label L.

As shown in FIGS. 8A, 8B, and 9, the Type B print label L is configured similar to the Type A print label L but with an additional pair of extended parts and an additional pair of connecting parts. Specifically, the print label L is functionally configured with first extended parts 42a identical to those in the Type A print label L, and two second extended parts 42b. The first extended parts 42a are located on the two ends of the overall print label. L and are bonded together. The second extended parts 42b are bonded together at a circumferential position on the opposite side of the print label L 180° from the first extended parts 42a. The second extended parts 42b are long portions extending the same distance LL (corresponding to the adherend-related information and the bonding distance) from a fold line 29 at a center position of the overall print label L in the conveying direction (the length direction) toward each respective end of the print label L. The release layer 24 is peeled off in the second extended parts 42b having the length 2×LL to expose adhesive parts that are bonded together by folding the print label L at the fold line 29. Since the wrapped parts 41, each forming a substantially semicircular shape, and the connecting parts 43 provided in four locations remain covered by the release layer 24 when wrapped around the adherend 30, the overall Type B print label L, like the Type A print label L, is rotatable printed matter that can freely rotate relative to the outer peripheral surface of the adherend 30.

From the perspective of the functional configuration described above, the Type B print label L has a line symmetrical layout about the fold line 29 in the center of the entire print label L in the conveying direction. That is, beginning from the fold line 29 and proceeding in sequence toward each end, the print label L has the second extended part 42b (an adhesive part), the wrapped part 41 with the two connecting parts 43 at both end thereof (a non-adhesive part), and the first extended part 42a (an adhesive part). A print area Ra is arranged in the center of each of a region S4 and a region S5. The wrapped parts 41 and the connecting parts 43 are divided into two locations (the regions S4 and S5) so that each of the regions S4 and S5 includes a wrapped part 41 and two connecting parts 43. Accordingly, as with the Type A print label L, the ends of the print area Ra having a length LC on each wrapped part 41 are symmetrically offset by the deviation D from ends of the respective regions S4 and S5.

An adhesive part N8 of the second extended part 42b arranged in the center of the print label L is separated by half cuts HC8 and HC9 from the non-adhesive parts S4 and S5 arranged on both sides thereof. Similarly, adhesive parts N7 and N9 of the first extended parts 42a disposed on respective ends of the print label L are separated from the adjacent regions S4 and S5 by half cuts HC7 and HC10, respectively. In this Type B print label L, the gap between the two half cuts HC7 and HC10 segmenting the adhesive parts N7 and N9 of the first extended parts 42a is defined as the distance L2 between end boundaries. For the Type B print label L, the full cutter 9A need only perform one full cut FC4 on the most upstream end of the print label L positioned a distance equivalent to the length L1 from the most downstream end.

Based on the layout rules for the functional configuration of the Type B print label L shown in FIG. 8B, the print label L has an overall length L1 in the conveying direction found by taking the sum of the distance L2 between end boundaries corresponding to the center of the print label L, and the lengths L3 of the adhesive parts N7 and N9 in the first extended parts 42a arranged on both ends of the print label L, as given in the following equation Eq. 6.

$$L1=L2+2\times L3 \quad \text{(Eq. 6)}$$

Further, based on the layout rules in the printing configuration for this Type B print label L, the overall length L1 of the print label L in the conveying direction is 2 times the sum of the length LC of the print area, the length LE of one margin, the deviation D, and the length LL of the second extended part 42b, as indicated in the following equation Eq. 7.

$$L1=2\times(LC+LE+D+LL) \quad \text{(Eq. 7)}$$

Further, the distance L2 between end boundaries in this Type B print label L is the following length found by adding 1.5 mm, equivalent to the length of an additional pair of connecting parts 43, and the lengths of the two second extended parts 42b (2×LL) to the distance L2 between end boundaries for the Type A print label L described above (see Eq. 3).

$$L2=(\phi 1+t+1)\times\pi+2\times 1.5+2\times LL \quad \text{(Eq. 8)}$$

When creating a Type B print label L, the label-creating device 1 according to the present embodiment described above executes the cut position adjustment process prior to creating the print label L to configure a layout that satisfies all specification conditions described above, i.e., that adjusts the arrangement of the two print areas Ra, and the positions of each of the half cuts HC7, HC8, HC9, and HC10 and the full cut FC4. Specifically, when executing the cut position adjustment process for this Type B print label L, the label-creating device 1 can calculate the dimension of each of the overall length L1 for the print label L, the distance L2 between end boundaries, and the lengths L3 of the first extended parts 42a based on the arbitrarily set length LC of the print area, the fixed margin lengths LE, and the outer diameter ϕ1 of the cable-like adherend 30.

Figure 10A:
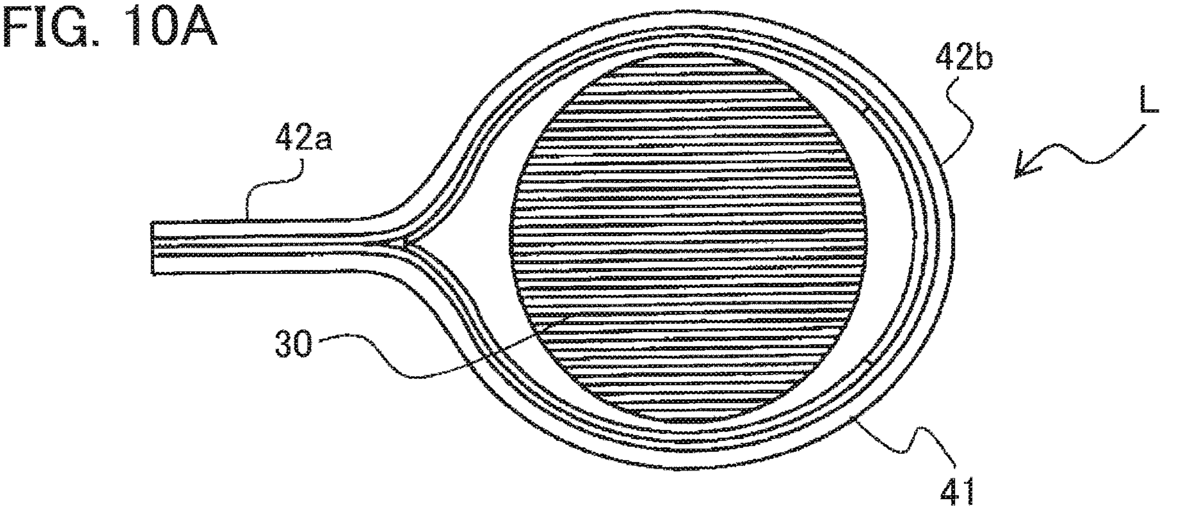
FIGS. 10A-10C are cross sections of the Type B print label illustrating other states of use.
Figure 10B:
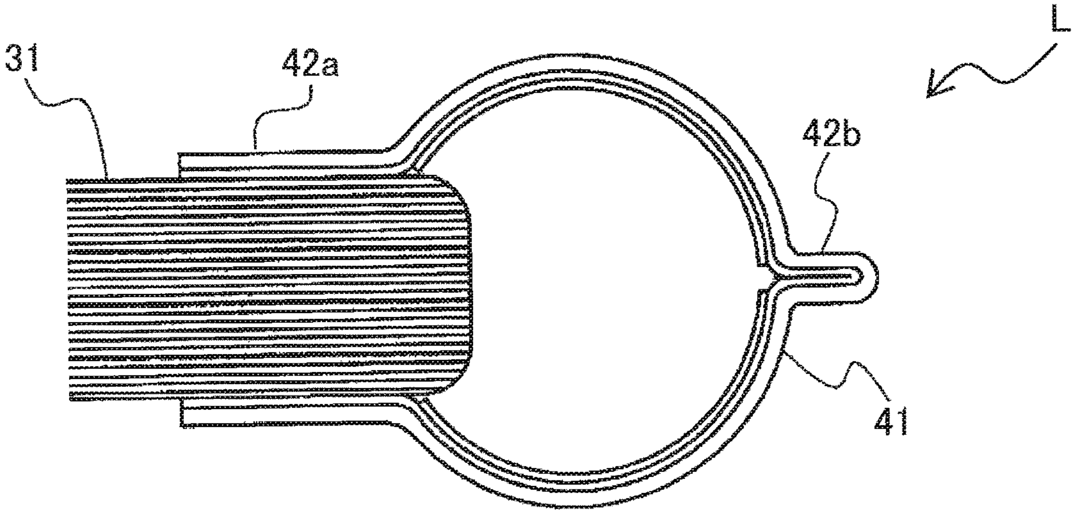
Figure 10C:
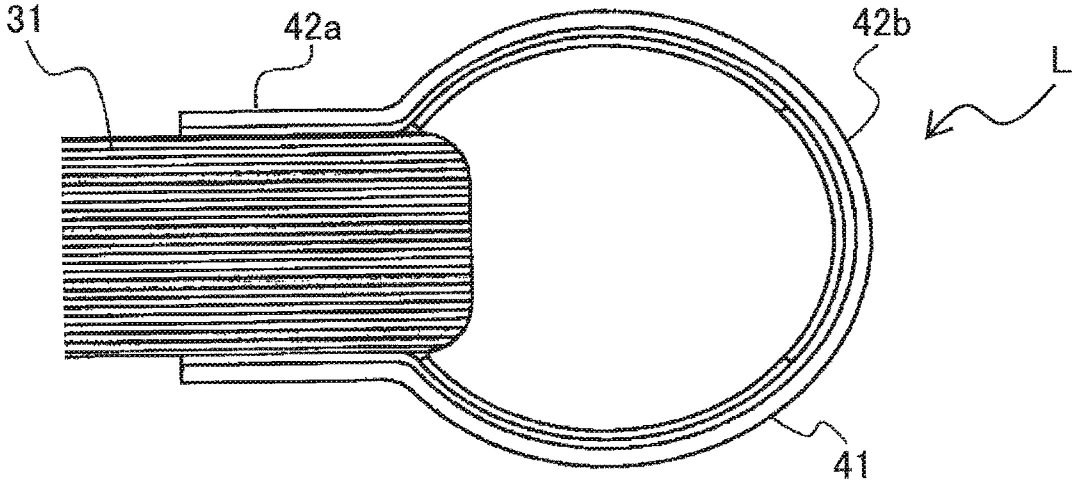

The Type B print label L can be used in various other applications in addition to that shown in FIG. 8. FIG. 10A shows a sample usage state in which the Type B print label L surrounds a cable-like adherend 30 while the release layer 24 remains covering the second extended parts 42*b* as well as the wrapped parts 41 so that the second extended parts 42*b* are not bonded together. In this case, the print label L is loosely fitted around the adherend 30 with a large gap formed therebetween since the circumferential length of the encircling portion is increased by the length of all the second extended parts 42*b* (2×LL). Further, the adherend is not limited to a cable-like object but may be a flat plate-like object such as the adherend 31 shown in FIGS. 10B and 10C, and the print label L May be utilized by bonding the adhesive parts of the first extended parts 42*a* to opposite side surfaces of the adherend 31. In this case, the second extended parts 42*b* may be bonded together, as in the example of FIG. 10B, or may remain covered by the release layer 24 and not bonded together, as in the example of FIG. 10C.

Detailed Configuration of Type C

Figure 11A:
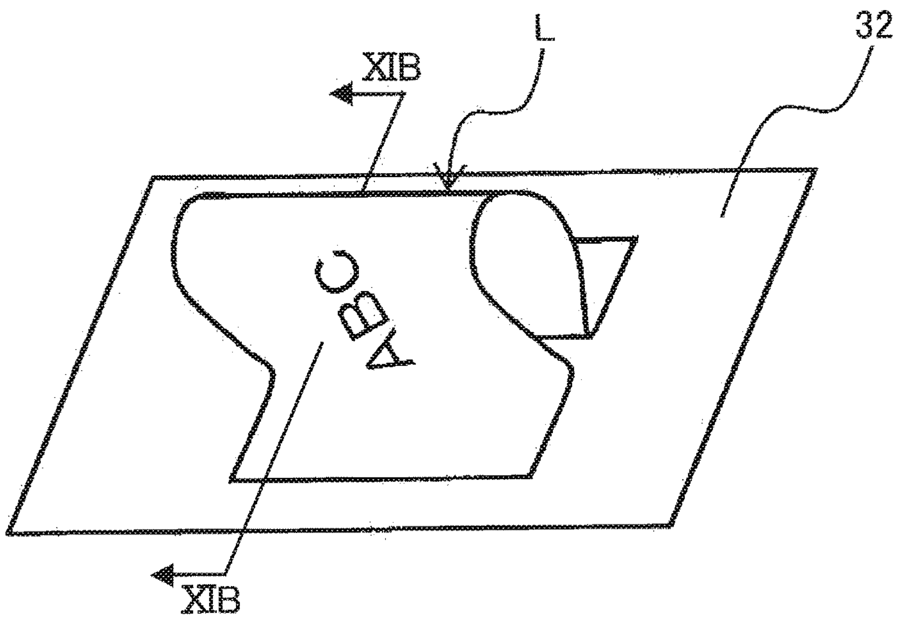
FIG. 11A is a perspective view showing an appearance of a. Type C print label in its state of use.
Figure 11B:
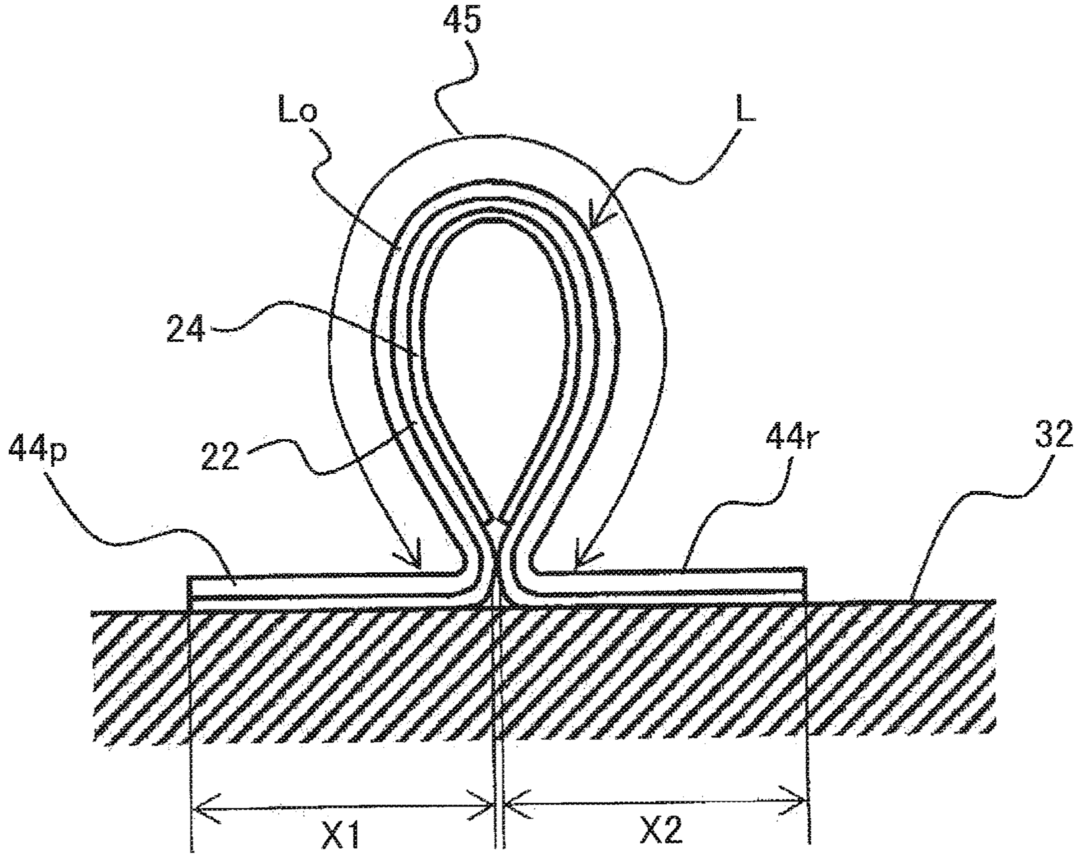
FIG. 11B is a cross section of the Type C print label taken along a plane XIB-XIB shown in FIG. 11A.
Figure 12:
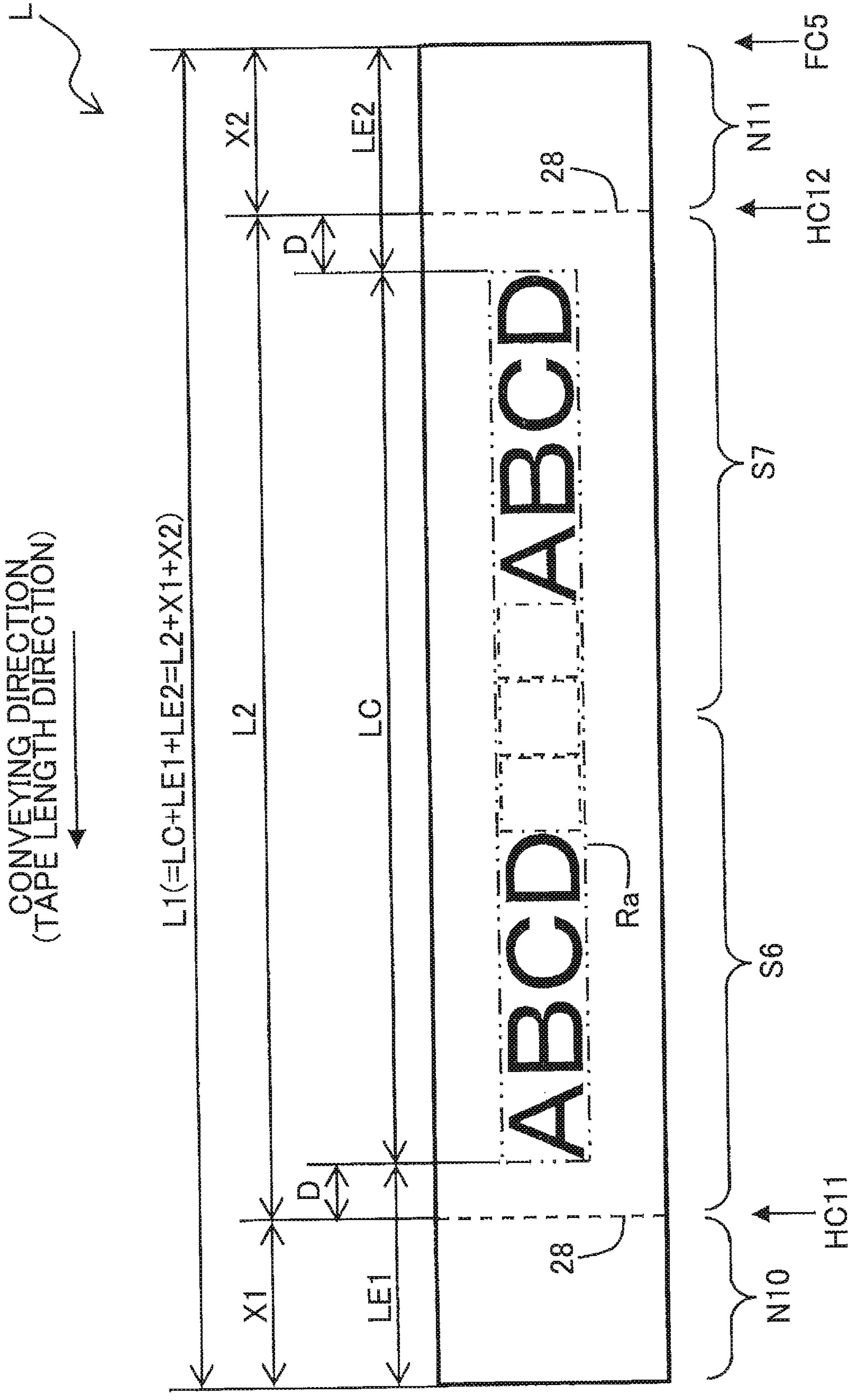
FIG. 12 is a planer diagram showing layout configuration of print content and various cuts of the Type C print label.

FIGS. 11A and 11B illustrate a sample usage state of a Type C print label L. FIG. 11A is a perspective view showing the appearance of the print label L in this application, and FIG. 11B is a cross-sectional view taken along the plane XIb-XIb in FIG. 11A. FIG. 12 shows the arrangement and composition of the print content and various cuts in this Type C print label L.

As shown in FIGS. 11A, 11B, and 12, the Type C print label L can be adhered in an upright state to the flat surface of the adherend 32 to produce an overall flag-like formation.

With this application, the parts of the Type C print label L can be functionally separated into two sections: two affixing parts 44*p* and 44*r* that are sticked to the surface of the adherend 32 adjacent to each other, and an upright part 45 that connects the opposing ends of the two affixing parts 44*p* and 44*r* and is erected in a general elliptical shape. In other words, the release layer 24 is only peeled off in the two affixing parts 44*p* and 44*r* located on both ends of the overall print label L in the tape length direction, and the exposed portions of the bonding adhesive layer 22 are sticked to the surface of the adherend 32 adjacent (or in close proximity) to each other. While the respective lengths X1 and X2 (corresponding to the adherend-related information) of these two affixing parts 44*p* and 44*r* are initially set to the same appropriate length (e.g., 8 mm), the user can set each of the lengths X1 and X2 of the affixing parts 44*p* and 44*r* individually to any length as needed to adapt flexibly to the shape and adherable area of the adherend 32. For this reason, a length LE1 of the downstream margin (corresponding to the downstream margin size) and a length LE2 of the upstream margin (corresponding to the upstream margin size) in a Type C print label L must sometimes be corrected based on the corresponding lengths set for the downstream end affixing part 44*p* and the upstream end affixing part 44*r*. Additionally, the inner circumferential surface of the upright part 45 basically remains covered by the release layer 24.

Since the upright part 45 is envisioned to be bent into a substantially elliptical shape as described above, two print areas in which the same print object (the text "ABCD" in the example shown in FIG. 12) is printed are arranged on the circumferential surface on both sides of the elliptical shape (both semi-ellipsoids). However, in this Type C print label L, these two print Objects are unified by adding a suitable number of blank characters (the three characters " . . . " in the example of FIG. 12) between the two print areas so that the single print area Ra is formed and processed for the unified print object. This single print area Ra (unified print area Ra) for the unified print object is arranged in the central region of the upright part 45. On the other hand, two printing areas S6 and S7 corresponding to the two original print objects are arranged adjacent to each other within the upright part 45 as the printing areas of the print label L. For this reason, both ends of the print area Ra having a length LC for the unified print object are located on the upright part 45 at positions offset symmetrically from the outer ends of the printing areas S6 and S7 by the deviation D, as in the Type A print label L described above.

From the perspective of the functional configuration described above for this Type C print label L, the downstream end affixing part 44*p* and the upstream end affixing part 44*r* (both adhesive parts), whose lengths X1 and X2 can be individually set, are arranged one on either end of the print label L in the conveying direction, and the upright part 45 (a nonadhesive part) is arranged therebetween. Half cuts HC11 and HC12 respectively separate the areas S6 and S7 of the upright part 45 arranged in the center of the print label L from areas N10 and N11 of the corresponding affixing parts 44*p* and 44*r* positioned adjacent to opposite ends of the upright part 45. In this Type C print label L, the gap between the two half cuts HC11 and HC12 that section off the areas N10 and N11 of the two affixing parts 44*p* and 44*r*, i.e., the overall length of the areas S6 and S7 in the upright part 45, is defined as the distance L2 between end boundaries. Further, the full cutter 9A need only perform one fall cut FC5 on the most upstream end of the Type C print label L located a distance equivalent to the length L1 from the most downstream end of the print label L.

Based on the above layout rules for the functional configuration of the Type C print label L shown in FIG. 11B, the overall length L1 of the print label L in the conveying direction is found by the following equation Eq. 9. That is, the overall length L1 is calculated as the sum of the length equivalent to the distance L2 between end boundaries for the upright part 45 arranged in the center of the print label L, and the lengths X1 and X2 individually set for the corresponding affixing parts 44*p* and 44*r* arranged at both ends of the print label L.

$$L1=L2+X1+X2 \quad \text{(Eq. 9)}$$

Further, from the perspective of the layout rules in the printing configuration of this Type C print label L, the overall length L1 of the print label L in the conveying direction is found by the following equation Eq. 10, that is, the sum of the combined length LC of the print area Ra, the length LE1 of the downstream margin, and the length LE2 of the upstream margin.

$$L1=LC+LE1+LE2 \quad \text{(Eq. 10)}$$

Further, the distance L2 between end boundaries in the Type C print label L is found according to the following equation Eq. 11, where the individually set affixing part lengths X1 and X2 are subtracted from the overall length L1 of the print label L.

$$L2=L1-X1-X2 \quad \text{(Eq. 11)}$$

To create this Type C print label L on the label-creating device 1 of the present embodiment described above, a layout satisfying all of the above specification conditions is set prior to creating the label. That is, the cut position adjustment process is executed to adjust the arrangement of the unified print area Ra, and the positions of each of the half cuts HC11 and HC12 and the full cut FC5. Specifically, in the cut position adjustment process for the Type C print label L, dimensions must be calculated for the overall length L1 of the print label L, the distance L2 between end boundaries, the length LE1 of the downstream margin, and the length LE2 of the upstream margin based on the arbitrarily set value for the length LC of the print area Ra, and each of the arbitrarily set values for the affixing part lengths X1 and X2.

Figure 13:
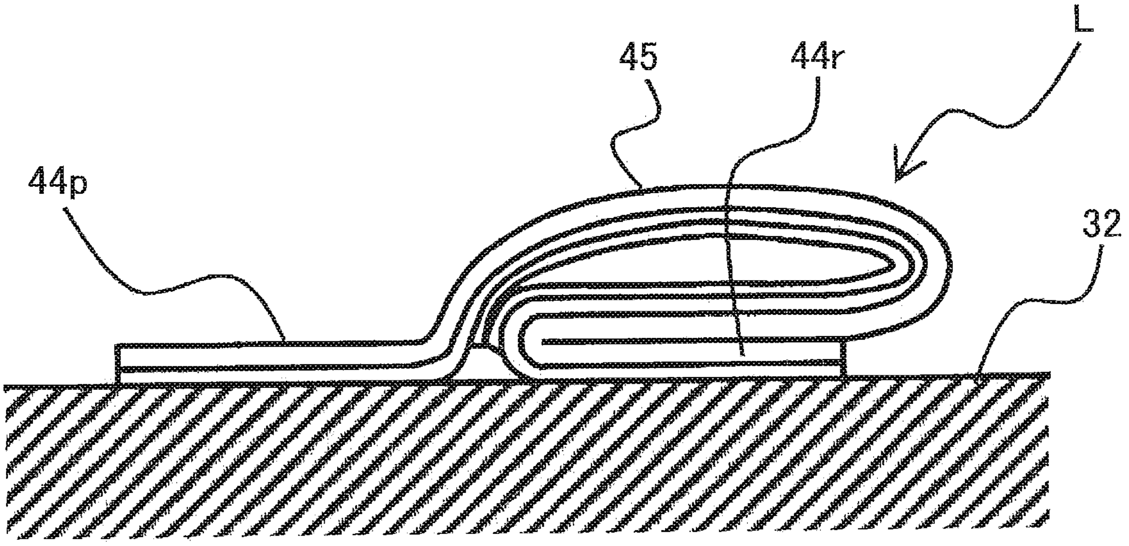
FIG. 13 is a cross sections of the Type C print label illustrating another state of use.

This Type C print label L can be used in various ways other than that shown in FIGS. 11A and 11B. As shown in the example of FIG. 13, the Type C print label L can be used in a deformed state in which the entire upright part 45 is laid down in a substantially flat shape. While not illustrated in the drawing, the release layer 24 may be peeled off in the inner circumferential side of the upright part 45 in this case, and the opposing sides of the upright part 45 may be bonded together.

In the configuration of each type described above, the half cuts HC1-HC12 is an example of the first through twelfth half cut positions; the full cuts FC1-FC5 are examples of the first through fifth full cut positions; and the printing areas S1-S7 are examples of the first through seventh printing areas.

Control Procedure

Figure 14:
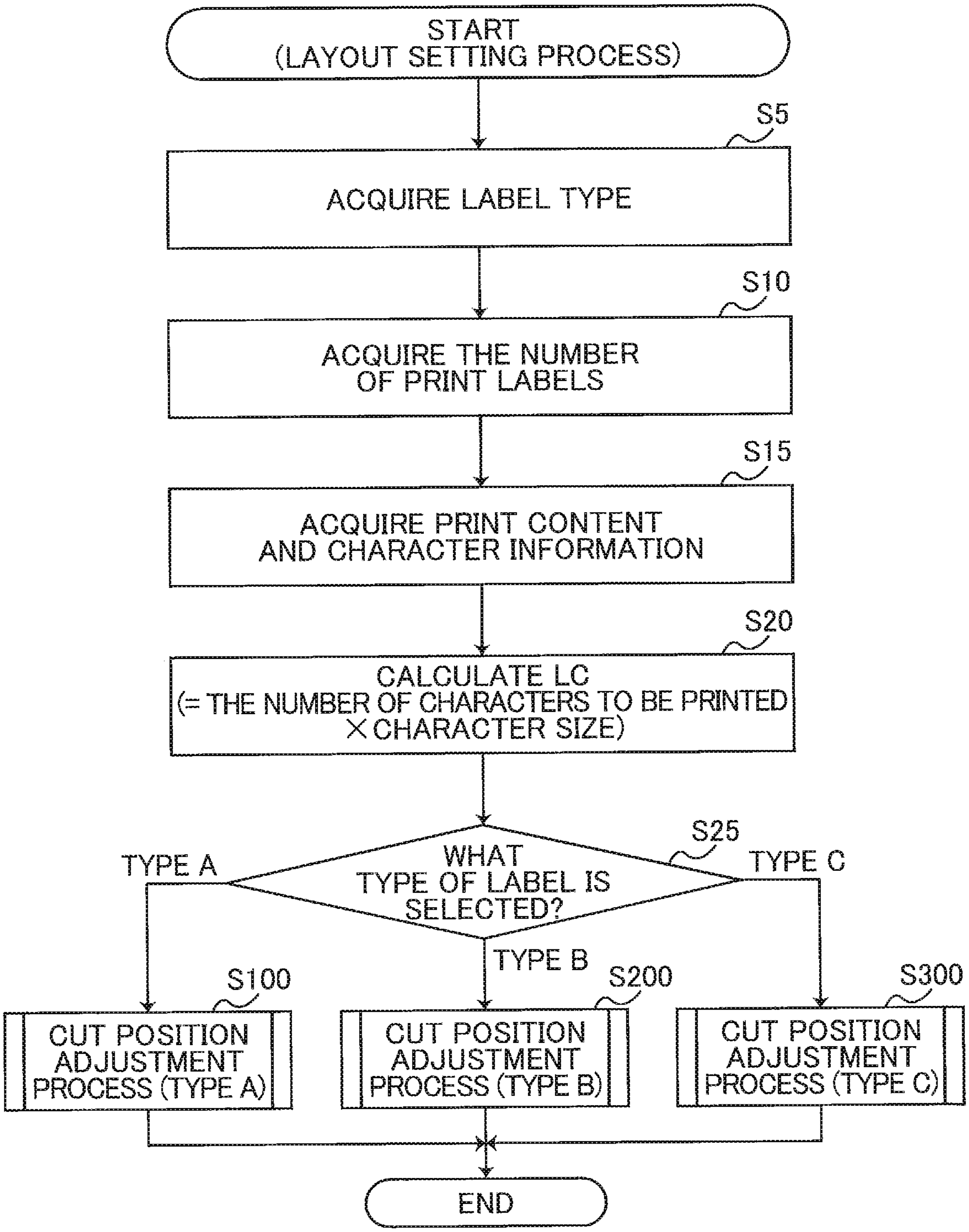
FIG. 14 is a flowchart illustrating a layout setting process.

A control procedure executed by the CPU of the control circuit 2 in the label-creating device 1 to implement the method of creating the various types of print labels L described above will be described with reference to the flowcharts in FIGS. 14, 15, 16, and 17. FIG. 14 is a flowchart illustrating steps in a layout setting process. The CPU executes this process after the label-creating device 1 has been started up. The layout setting process prompts the user to perform suitable operations for setting the type of print label L to be created and the layout for that print label L. Once the type of print label L to be created has been selected, the CPU executes one of the flowcharts shown in FIGS. 15-17 corresponding to the type selected in the above layout setting process. The control procedure for executing the layout setting process shown in FIG. 14 will be described next in detail.

In step S5 at the beginning of the layout setting process, the CPU of the control circuit 2 acquires information indicating the type of print label L to be created from among Type A, Type B, and Type C. This information is inputted by the user through operations on the operation interface 3 provided in the label-creating device 1 or is received via the communication interface 8 through user operations on an external operation terminal (not shown).

In step S10 the CPU of the control circuit 2 acquires the number of print labels L to be printed, using the same method of acquisition described in step S5.

In step S15 the CPU of the control circuit 2 acquires the print content of one or more print objects to be printed on the print label L and character information when the content is text, such as the character size, according to the same method of acquisition described in step S5.

In step S20 the CPU of the control circuit 2 calculates the length LC of the print area for one or more print objects based on the print content and the character information acquired in step S15. Here, in a case that Type A or Type B was selected in step S5, the CPU calculates the length LC of the print area based on the number and size of the characters being printed for one print object. In a case that Type A was selected and the number of sheets to be printed is two and the print objects for the two sheets are different from each other, the CPU calculates the length LC of the print area for each of the two sheets. In a case that Type C was selected, the two print objects are separated by a suitable number of blank characters and combined into a final print object (unified print object), and the CPU calculates the overall length LC of the print area for the final print object.

In step S25 the CPU of the control circuit 2 determines whether the type selection acquired in step S5 was a selection for Type A, Type B, or Type C. When Type A was selected, the CPU executes the cut position adjustment process for Type A in step S100 and subsequently ends the control procedure of FIG. 14. When Type B was selected, the CPU executes the cut position adjustment process for Type B in step S200 and subsequently ends the control procedure of FIG. 14. When. Type C was selected, the CPU executes the cut position adjustment process for Type C in step S300 and subsequently ends the control procedure of FIG. 14. The layout settings set in the layout setting process shown in FIG. 14 is used when creating the print label L of one of Type A, B, and C by printing an image on the cover film 23 and performing half cuts and full cut on the tape T.

Figure 15:
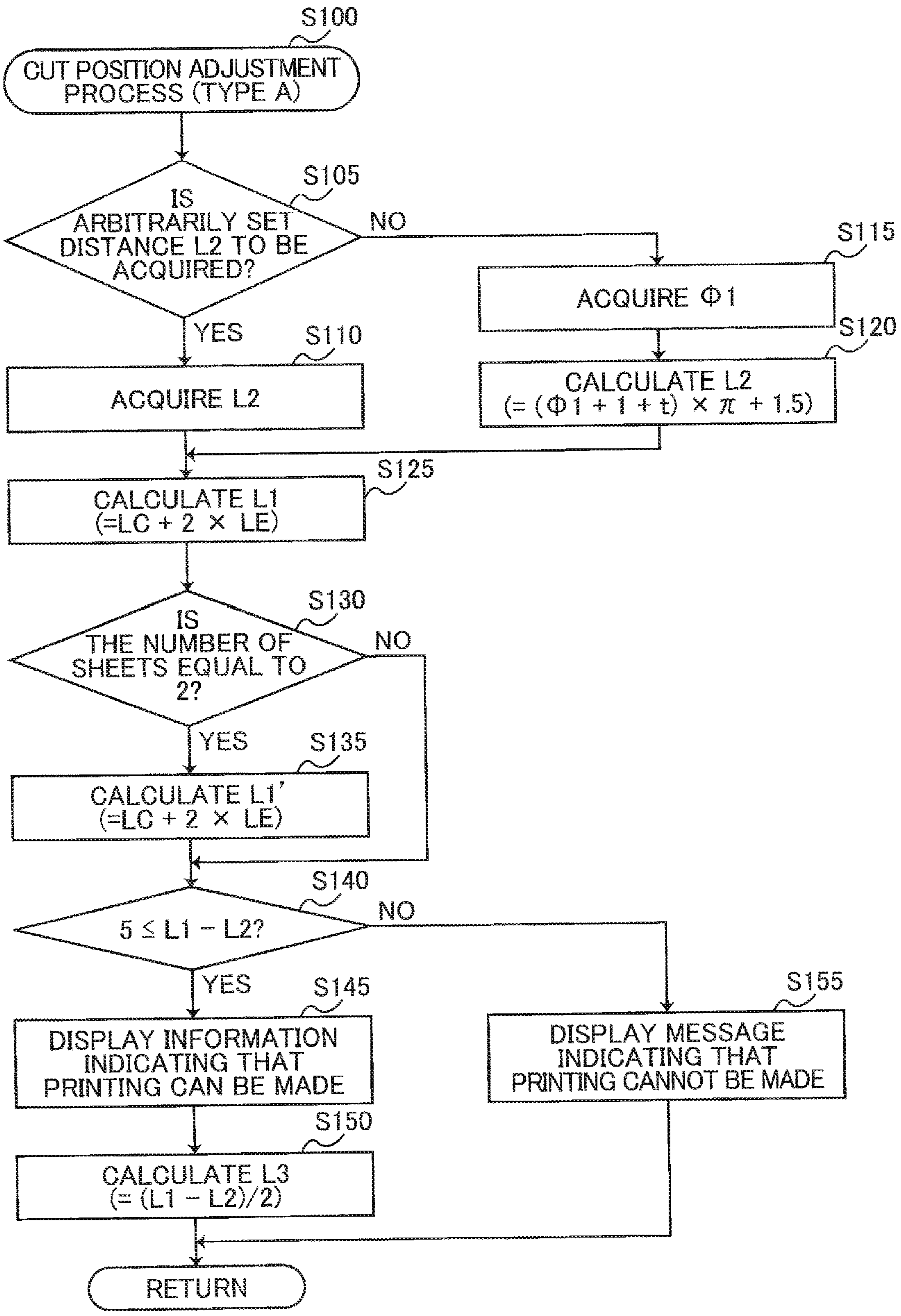
FIG. 15 is a flowchart illustrating a cut position adjustment process for Type A.

Next, a control procedure when executing the cut position adjustment process for Type A will be described in detail with reference to FIG. 15.

In step S105 at the beginning of the cut position adjustment process, the CPU of the control circuit 2 determines whether or not to acquire a distance L2 between end boundaries arbitrarily set by a user through an operation on the operation interface 3 or an external operation terminal When the CPU is to acquire an arbitrarily set distance L2 between end boundaries (S105: YES), the CPU advances to step S110.

In step S110 the CPU of the control circuit 2 acquires a distance L2 between end boundaries arbitrarily set by the user in the same method of acquisition described in step S5. Subsequently, the CPU advances to step S125.

However, when the CPU determines in step S105 that the distance L2 between end boundaries is to be calculated based on the outer diameter $\phi 1$ of the cable-like adherend 30 rather than set to an arbitrary value by the user (S105: NO), the CPU advances to step S115.

In step S115 the CPU of the control circuit 2 acquires the value for the outer diameter $\phi 1$ of the adherend 30 according to the same method of acquisition described in step S5. Although not illustrated in the drawing, the medium thickness t of the overall print label L may also be obtained separately from the user or the CPU may substitute a suitable default dimension, such as 60 μm, when the medium thickness t is not known by the user and cannot be acquired.

In step S120 the CPU of the control circuit 2 calculates the distance L2 between end boundaries by substituting the outer diameter $\phi 1$ and the medium thickness t into the formula in Eq. 3 described above ($L2=(\phi 1+1+t)\times\pi+1.5$). Subsequently, the CPU advances to step S125. Note that the distance L2 between end boundaries may also be calculated according to the formula in Eq. 4 described above ($L2=(\phi 1+1+t)\times\pi\times K$). The procedure of this step S120 is an example of the first half cut distance setting process.

In step S125 the CPU of the control circuit 2 calculates the overall length L1 of the print label L by substituting the distance LC of the print area for the print object and the margin length LE into the formula in Eq. 1 described above ($L1=LC+2\times LE$). The procedure in step S125 is an example of the determination process. When the number of sheets to be printed is two, the distance Lc for the first sheet is used in S125.

In step S130 the CPU of the control circuit 2 determines whether the number of sheets to be printed was specified as two sheets in step S10. When the number of sheets to be printed is not two (S130: NO), the CPU advances to step S140.

However, when the number of sheets to be printed is two (S130: YES), the CPU advances to step S135.

In step S135 the CPU of the control circuit 2 calculates the overall length L1' of the second print label L' by substituting the distance LC of the print area for the print object of the second sheet and the margin length LE into the formula in Eq. 1 described above (L1'=LC+2×LE). Subsequently, the CPU advances to step S140.

In step S140 the CPU of the control circuit 2 determines whether at least 2.5 mm can be allocated for the length L3 of the adhesive part on each extended part 42. In other words, the CPU of the control circuit 2 determines whether the difference between the overall length L1 and the distance L2 between end boundaries is at least 5 mm. When the difference is at least 5 mm (S140: YES), the CPU advances to step S145. In a case that the number of sheets to be printed is two, the CPU determines whether the difference between the overall length L1' and the distance L2 *b* is at least 5 mm In this case, YES determination may be made in S140 when both the difference between the length L1 and L2 and the difference between the length L1' and the distance L2 is at least 5 mm, whereas NO determination may be made in S140 when at least one of these difference is smaller than 5 mm. The procedure in step S140 is an example of the first determination process.

In step S145 the CPU of the control circuit 2 displays, on the display 4 provided in the label-creating device 1 or on the external operation terminal (not shown in the drawings) via the communication interface 8, information indicating that the print label L can be printed because the length L3 larger than 2.5 mm is secured for the adhesive part on each extended part 42.

In step S150 the CPU of the control circuit 2 calculates the length L3 of the adhesive part on each extended part 42 using the formula L3=(L1−L2)/2. This ends the flowchart of FIG. 15.

However, when the CPU of the control circuit 2 determines in step S140 that the difference between the overall length L1 and the distance L2 between end boundaries is less than 5 mm (S140: NO), the CPU advances to step S155.

In step S155 the CPU of the control circuit 2 displays an error message according to the same method described above in step S145 indicating that the print label L cannot be printed because the length L3 of the adhesive part on each extended part 42 is less than 2.5 mm. Subsequently, the flowchart of FIG. 15 ends. The procedure in step S155 is an example of the first error display process.

Next, a control procedure when executing the cut position adjustment process for Type B will be described in detail with reference to FIG. 16.

Figure 16:
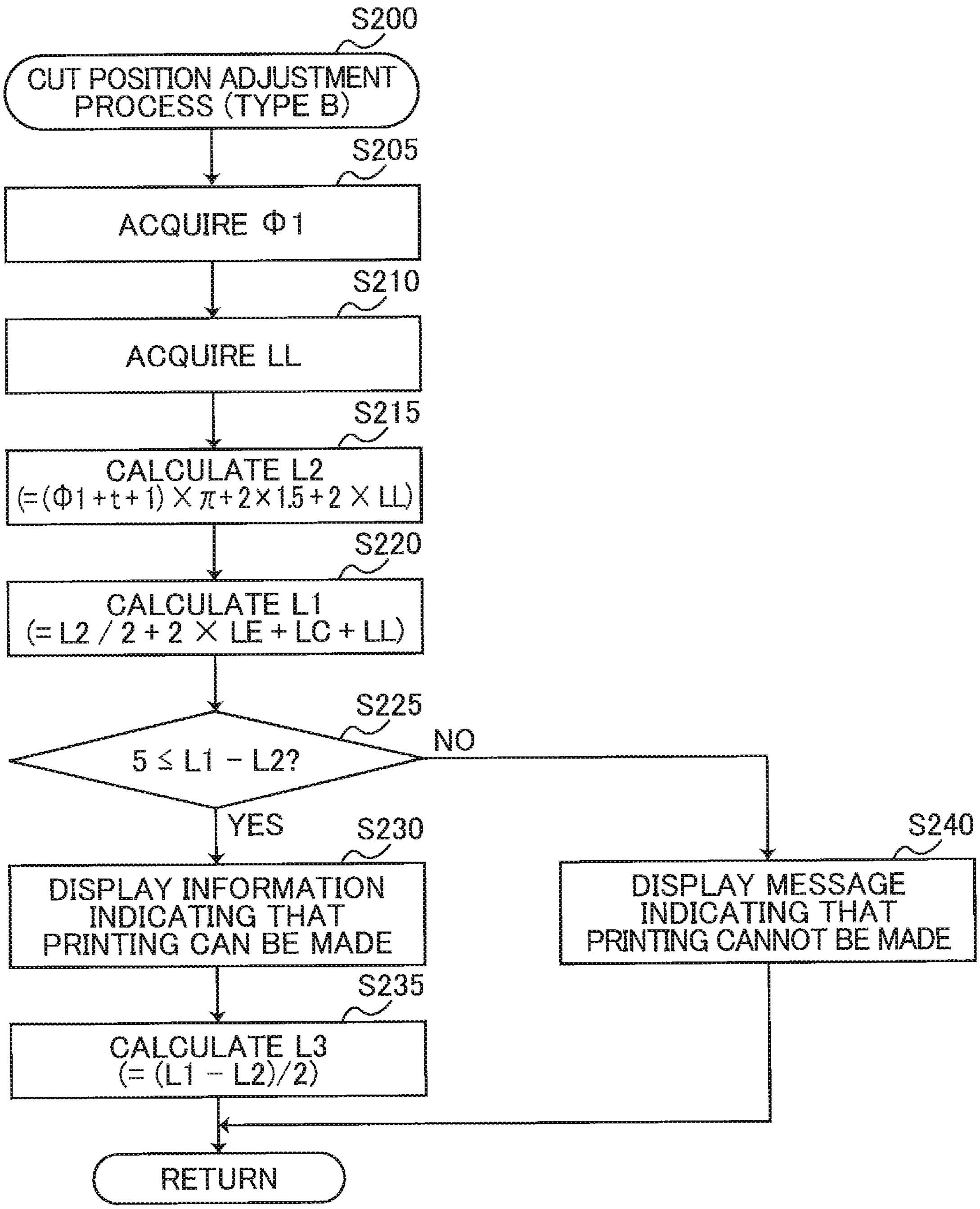
FIG. 16 is a flowchart illustrating a cut position adjustment process for Type B.

In S205 at the beginning of the process in FIG. 16, the CPU of the control circuit 2 acquires the value of the outer diameter ϕ1 for the adherend 30 according to the same method of acquisition described in step S5.

In S210 the CPU of the control circuit 2 acquires the length LL for the second extended part 42*b* (on one side) through the same method of acquisition described in step S5.

In S215 the CPU of the control circuit 2 calculates the distance L2 between end boundaries by substituting the outer diameter ϕ1, the medium thickness t, and the length LL of the second extended part into the formula in Eq. 8 described above (L2=(ϕ1+t+1)×π+2×1.5+2×LL). The procedure in step S215 is an example of the second half cut distance setting process.

In S220 the CPU of the control circuit 2 calculates the overall length L1 of the print label L. While the formula (L1=2×(LC+LE+D+LL)) in Eq. 7 is appropriate to use at this time, the deviation. D in this formula is an unknown quantity and must be eliminated by substitution. In the Type B layout configuration shown in FIG. 9, the distance L2 between end boundaries can be expressed as follows.

$$L2=2\times LC+2\times LL+4\times D \quad \text{(Eq. 12)}$$

By eliminating the deviation D from Eq. 12 and Eq. 7 described above, the overall length L1 can be expressed as follows.

$$L1=L2/2+2\times LE+LC+LL \quad \text{(Eq. 13)}$$

Since L2, LE, LC, and LL are all known quantities at the timing of step S220, the overall length L1 can be calculated using Eq. 13. The procedure of step S220 is an example of the setting process.

The procedure in subsequent steps S225-S240 is identical in content to steps S140-S150 described above and, therefore, a description of this procedure has been omitted.

Next, a control procedure when executing the cut position adjustment process for Type C will be described in detail with reference to FIG. 17.

Figure 17:
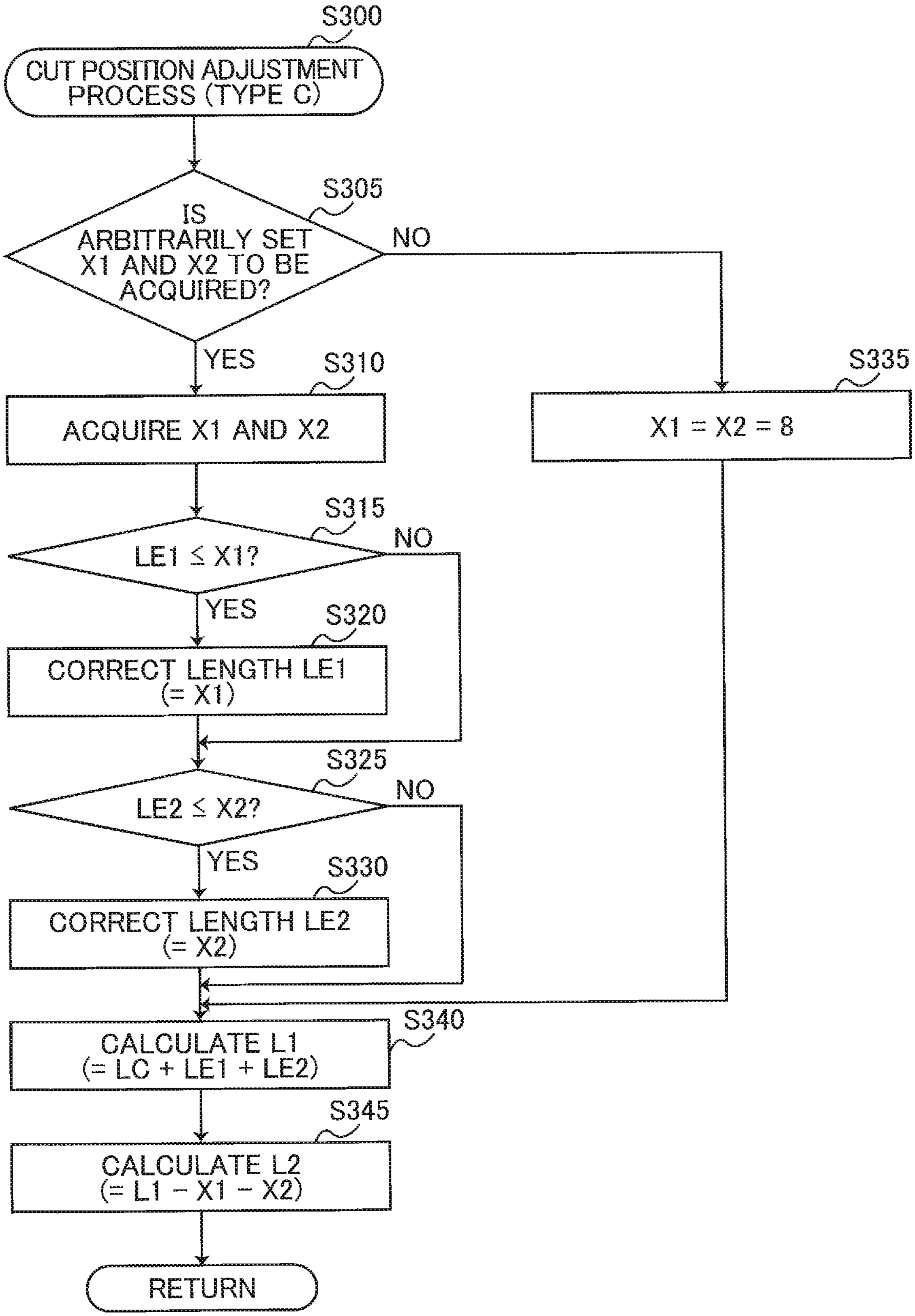
FIG. 17 is a flowchart illustrating a cut position adjustment process for Type C.

In step S305 at the beginning of the process in FIG. 17, the CPU of the control circuit 2 determines whether or not to acquire arbitrarily set lengths X1 and X2 for the affixing parts through input operations by the user according to the same method described in step S5. When arbitrarily set lengths X1 and X2 for the affixing parts are to be acquired (S305: YES), the CPU advances to S310.

In step S310 the CPU of the control circuit 2 acquires the lengths X1 and X2 of the affixing parts according to the same method of acquisition described in step S5.

In step S315 the CPU of the control circuit 2 determines whether the length X1 arbitrarily set for the downstream end affixing part 44*p* is greater than or equal to the length LE1 initially set for the downstream margin. When the length X1 is less than the length LE1, that is, when the print area Ra for the unified print object does not reach the downstream end affixing part 44*p* (S315: NO), the CPU advances to step S325 without adjusting the length LE1. The procedure of step S315 is an example of the second determination process.

However, when the length X1 is greater than or equal to the length LE1, i.e., when the print area Ra for the unified print object extends onto the downstream end affixing part 44*p* (S315: YES), the CPU advances to step S320.

In step S320 the CPU of the control circuit 2 corrects the length LE1 to a length equivalent to the length X1 (or greater than or equal to the length X1) and subsequently advances to step S325. The procedure in step S320 is an example of the first correction process. While not shown in the drawings, rather than performing the correction process described above, in step S320 the CPU may display an error indicating that printing cannot be performed and subsequently end the process in FIG. 17. In this case, the procedure in step S320 is an example of the second error display process.

In step S325 the CPU of the control circuit 2 determines whether the length X2 arbitrarily set for the upstream end affixing part 44*r* is greater than or equal to the length LE2 initially set for the upstream margin. When the length X2 is less than the length LE2, that is, when the print area Ra for the unified print object does not reach the upstream end affixing part 44*r* (S325: NO), the CPU advances to step S340 without adjusting the length LE2. The procedure in step S325 is an example of the third determination process.

However, when the length X2 is greater than or equal to the length LE2, that is, when the print area Ra for the unified print object extends onto the upstream end affixing part 44*r* (S325: YES), the CPU advances to S330.

In step S330 the CPU of the control circuit 2 corrects the length LE2 to a length equivalent to the length X2 (or greater than or equal to the length X2) and subsequently advances to step S340. The procedure in step S330 is an example of the second correction process. While not shown in the drawings, in place of the correction process described above, in step S330 the CPU may display an error indicating that printing cannot be performed and may subsequently end the process in FIG. 17. In this case, the procedure in step S330 is an example of the third error display process.

Further, when the CPU of the control circuit 2 determines in step S305 that arbitrarily set lengths X1 and X2 are not to be acquired (S305: NO), the CPU advances to step S335.

In step S335 the CPU of the control circuit 2 sets the lengths X1 and X2 for the affixing parts to the same length, such as 8 mm, which is an example of the initial setting. Subsequently, the CPU advances to step S340.

In step S340 the CPU of the control circuit 2 calculates the overall length L1 of the print label L by substituting the length LC of the print area, and the lengths LE1 and LE2 for the two margins into the formula of Eq. 10 described above (L1=LC+LE1+LE2). The procedure in step S340 is an example of the setting process.

In S345 the CPU of the control circuit 2 calculates the distance L2 between end boundaries by substituting the overall length L1, and the lengths X1 and X2 of the affixing parts into the formula of Eq. 11 described above (L2=L1−X1−X2). Subsequently, the process in FIG. 17 ends. The procedure in step S345 is an example of the third half cut distance setting process.

Effects of the Present Embodiment

As described above, the structure of the printed label L, which is created by the label-creating device 1 of the present embodiment, has a half cut for cutting through the release layer 24 by the half cutter 9B (HC1, HC3, HC5, HC7, and HC11). The half cut is formed in a part downstream from the printed part. As a result, by peeling the release layer 24 from the non-printed part side of the cut position (the downstream side in the conveying direction), the portion of the print label L from which the release layer 24 was removed becomes an adhesive part (N1, N3, N5, N7, and N10), while the portion of the print label L from which the release layer 24 is not removed can serve as the non-adhesive part (S1-S7).

With this configuration, the print label L can be configured as rotatable printed matter that is rotatably mounted around the cable-like adherend 30, for example. Specifically, the print label L is wrapped once around the adherend 30 in a substantially annular shape so that no adhesive part contacts the adherend 30. Subsequently, the adhesive part on the downstream side in the conveying direction is bonded to the non-adhesive part on the upstream side in the conveying direction. Or, the adhesive part on the downstream side in the conveying direction is overwrapped with and bonded to the adhesive part on the upstream side in the conveying direction.

Alternatively, the adhesive part of the print label L on the downstream side in the conveying direction can be slicked to the flat surface of the adherend 31, for example, while the non-adhesive part on the upstream side in the conveying direction that protrudes or is erected from the surface is used as a tag.

Various other methods of use are also possible depending on the user's needs. For example, when a half cut is made in a part upstream from the most downstream section of the printed part, the release material can be peeled off in the non-printed part side (the upstream side in the conveying direction) of the half cut.

When creating a print label L for use in various forms as described above, the position of the half cut can be variably set to a suitable position in the tape length direction through control by the control circuit 2. That is, the position and size of the adhesive part formed by peeling off the release layer 24 can be varied. Thus, when attaching the print label L to a cable-like adherend 30, for example, the rotatable printed matter having an adhesive part can be created so that the printed matter has a size suited to the diameter of the adherend 30, regardless of whether the diameter is large or small Alternatively, when the print label L is to be attached to a flat surface of the adherend 31, for example, the adhesive part of the print label L being attached to the surface can be varied in size according to the user's preference and the application.

As described above, the present disclosure can create print labels L that meet the various needs of users, thereby improving convenience for users.

According to the present embodiment, by making a half cut in the area upstream of the most downstream section of the printed part (HC2, HC4, HC6, HC10, and HC12), the release layer 24 can be peeled off in the non-printed part side (the upstream side in the conveying direction) of this half cut to form an adhesive part (N2, N4, N6, N9, and N12). Thus, an even greater variety of methods of use are possible according to the user's needs.

According to the present embodiment, by forming a full cut on the upstream side of the most upstream section of the printed part, a single independent print label L that retains the entire printed part can be created.

According to the present embodiment, the position in the tape length direction for at least one of the half cut and full cut is set variably according to inputted adherend-related information specifying the outer diameter $\phi$1. Accordingly, the position and size of the adhesive part formed by peeling off the release layer 24 as described above, can be varied according to the diameter of the capable like adherend 30 around which the print label L is to be attached. As a result, the rotatable printed matter to have an adhesive part can be created so that the size suitable of the printed matter is suitable for the diameter of the adherend 30, regardless of whether the diameter is large or small.

According to the present embodiment, half cuts are formed in the release layer 24 at two locations based on inputted adherend-related information specifying the outer diameter $\phi$1, and the distance between the two half cuts is set variably. Accordingly, the size and position of the non-adhesive part on the print label L between the two half cut areas, where the release layer 24 is not peeled off, can be varied based on the diameter of the cable-like adherend 30 around which the print label L is to be attached. As a result, the rotatable printed matter described above can be created to have a non-adhesive part of a size suitable for the diameter of the adherend 30, regardless of whether the diameter is large or small.

According to the present embodiment, half cuts and full cuts are made based on inputted adherend-related information specifying the outer diameter $\phi$1, and the distance between the half cut and the full cut is set variably. Accordingly, the size and position of the adhesive part on the print label L between each half cut and corresponding full cut that is formed by peeling off the release layer 24 as described above can be varied according to the diameter of the cable-like adherend 30 around which the print label L is to be attached. As a result, the rotatable printed matter with an adhesive part can be created so that the size of the rotatable printed matter is suitable for the diameter of the adherend 30, regardless of whether the diameter is large or small.

According to the present embodiment, the outer diameter $\phi$1 of the adherend 30 is inputted as adherend-related information. Further, in the procedure of step S120 (FIG. 15), the distance L2 between two adjacent half cut areas, between which a full cut area is not interposed, is set to L2=($\phi$1+t+1)×π+1.5, where t is the tape thickness. In this way, a Type A print label L can be created as the rotatable printed matter that has a non-adhesive area of a suitable size for the diameter $\phi$1 of the adherend 30.

According to the present embodiment, in the procedure of step S125 described above, the CPU sets the dimension L1 of the print label L in the tape length direction based on inputted print content for the print object and, in the procedure of step S140 described above, determines whether L1−L2 is greater than or equal to a prescribed threshold value. When the CPU determines that L1−L2 is less than the threshold value, the CPU displays an error message on the display 4 in the procedure of step S155 indicating that the printed matter cannot be created. In this way, the user can be reliably made aware when a Type A print label L cannot be created under the conditions set by the user.

According to the present embodiment, the half cut HC1, the printing area S1, the half cut HC2, and the full cut FC1 are arranged in this order from the downstream side to the upstream side in the tape conveying direction, as shown in FIG. 4. Accordingly, the Type A print label L can be configured with a functional layout in which the adhesive and non-adhesive parts are alternately arranged.

According to the present embodiment, when creating a Type A print label L, the distance L3 from the downstream end of the print label L in the conveying direction to the half cut HC1 is set to (L1−L2)/2, the distance from the half cut HC1 to the half cut HC2 is set as L2, and the distance from the half cut HC2 to the full cut FC1 is set to (L1−L2)/2. These settings conform with the layout rules for the printing composition so that the printing area S1 in the Type A print label L is positioned in the overall center of the print label L.

According to the present embodiment, as shown in FIG. 7B, in a multi-label creation mode for creating a plurality of print labels L, the half cut HC3, the printing area S2, the half cut HC4, the full cut FC2, the half cut HC5, the printing area S3, the half cut HC6, and the full cut FC3 are arranged in this order from the downstream side toward the upstream side of the tape conveying direction. Thus, when creating a plurality of Type A print labels L in the multi-label creation mode, a functional layout can be configured with adhesive parts and non-adhesive parts suitably arranged.

According to the present embodiment, when creating a print label L, the distances are set as follows. That is, the distance L3 from the downstream end of the tape in the conveying direction to the half cut HC3 is set to (L1−L2)/2. The distance from the half cut HC3 to the half cut HC4 is set to L2. The distance L3 from the half cut HC4 to the full cut FC2 is set to (L1−L2)/2. The distance L3 from the full cut FC2 to the half cut HC5 is set to (L1−L2)/2. The distance from the half cut HC5 to the half cut HC6 is set to L2. The distance L3 from the half cut HC6 to the full cut FC3 is set to (L1−L2)/2. These settings can conform with the layout rules for a printing composition when creating a plurality of Type A print labels L in the multi-label creation mode, whereby the printing areas S2 and S3 are positioned in the respective centers of the overall print labels L and L'.

According to the present embodiment, as shown in FIG. 9, the half cut HC7, the printing area S4, the half cut HC8, the half cut HC9, the printing area S5, the half cut HC10, and the full cut FC4 are formed in this order from the downstream side toward the upstream side in the tape conveying direction. In this way, a functional layout can be configured in a Type B print label L having second extended parts 42*b* while the adhesive and non-adhesive parts are alternately arranged.

According to the present embodiment, the outer diameter $\phi$1 of the adherend 30 and the bonding length LL of the second extended parts 42*b* are inputted as adherend-related information, as shown in FIG. 16. Here, the second extended parts 42*b* (FIG. 9) is used when the print label L is folded over to bond the back surfaces of the base material together. In the procedure of step S215, the distance L2 between two adjacent half cuts, between which no full cut is made, is determined by L2=($\phi$1+t+1)×π+1.5×2+LL×2, where t is the tape thickness. In this way, the Type B print label L can be created as the rotatable printed matter of a suitable size for the outer diameter $\phi$1 of the adherend 30 with a non-adhesive part.

According to the present embodiment, as shown in FIG. 16, in the procedure of step S220 described above, the CPU sets the dimension L1 of the print label L in the tape length direction based on inputted print content for print objects. In the procedure of step S225 described above, the CPU determines whether L1−L2 is greater than or equal to a prescribed threshold value. When the CPU determines that L1−L2 is less than the threshold value, in the procedure of step S240 the CPU displays an error message on the display 4 indicating that the printed matter cannot be created. These procedures ensure that the user is made aware that the Type B print label L cannot be created under the conditions set by the user.

According to the present embodiment, when creating a Type B print label L (FIG. 9), the distances are set as follows. That is, the distance L3 from the downstream end of the tape in the conveying direction to the half cut HC7 is set to (L1−L2)/2. The distance from the half cut HC7 to the half cut HC8 is set to ($\phi$1+t+1)×π/2+1.5. The distance from the half cut HC8 to the half cut HC9 is set to LL×2, The distance from the half cut HC9 to the half cut HC10 is set to ($\phi$1+t+1)×π/2+1.5. The distance L3 from the half cut HC10 to the full cut FC4 is set to (L1−L2)/2. In this way, the two printing areas S4 and S5 in the Type B print label L can be arranged symmetrically with respect to the overall center of the print label L.

According to the present embodiment, as shown in FIG. 12, the half cut HC11, the printing area S6, the printing area S7, the half cut HC12, and the full cut FC5 are arranged in this order from the downstream side to the upstream side in the tape conveying direction. In this way, a functional layout can be configured in the Type C print label L in which the adhesive and non-adhesive parts are alternately arranged.

According to the present embodiment, the distance X1 from the downstream end of the tape in the conveying direction to the half cut HC11 and the distance X2 from the half cut HC12 to the full cut FC5 are inputted as adherend-related information. This enables the user to arbitrarily set individual values for the length X1 of the downstream end affixing part 44*p* and the length X2 of the upstream end affixing part 44*r* in the Type C print label L.

According to the present embodiment, the CPU determines in the procedure of step S315 (FIG. 17) whether the inputted X1 is greater than or equal to the preset dimension LE1 for the downstream margin. When the CPU determines that X1 is greater than or equal to the dimension LE1 of the downstream margin, in the procedure of step S320 the CPU corrects the downstream margin size LE1 to a value greater than or equal to X1. Accordingly, when the Type C print label L cannot be created using the user-set value for the distance X1 from the downstream end in the tape conveying direction to the half cut HC11, the dimension LE1 can be automatically corrected to an appropriate value and applied to the print label L. Alternatively, as described above the error message indicating that the print label L cannot be created may be displayed on the display 4 in place of the procedure of step S320 to ensure that the user is aware of the problem.

According to the present embodiment, the CPU determines in the procedure of step S325 whether the inputted X2 is greater than or equal to the preset dimension LE2 for the upstream margin. When the CPU determines that the X2 is greater than or equal to the dimension LE2 for the upstream margin, in the procedure of S330 the CPU corrects the dimension LE2 for the upstream margin to a value greater than or equal to X2. Accordingly, when the Type C print label L cannot be created using the user-set value for the distance X2 from the full cut FC5, which is the upstream end of the print label L in the conveying direction, to the half cut HC12, the dimension LE2 can be automatically corrected to a suitable value and applied to the print label L. Alternatively, as described above the error message indicating that the print label L cannot be created may be displayed on the display 4 in place of the procedure for step S330 to ensure that the user is aware of the problem.

According to the present embodiment, the CPU sets the dimension L1 of the print label L in the tape length direction based on inputted print content for print objects in the procedure of step S340 and sets the length L2 from the half cut HC11 to the half cut HC12 to L2=L1−X1−X2 in the procedure of step S345. Further, when creating the Type C print label L, the CPU sets the distance from the downstream end of the tape in the conveying direction to the half cut HC11 to X1, sets the distance from the half cut HC to the half cut HC12 to L2, and sets the distance from the half cut HC12 to the full cut FC5 to X2. In this way, the printing areas S6 and S7 in a Type C print label L can be symmetrically arranged with respect to the overall center of the print label L.

According to the present embodiment, the pressure rollers 13A and 13B conveys a printed tape T formed by bonding the cover film 23, which has been printed by the print head 7, with the tape To having the transparent base layer 21 and the release layer 24. Even when the downstream portion of the print label L in the conveying direction is overlaid on the upstream side in the conveying direction as in the example described above, the portion overlaid on the bottom can be seen through the portion overlaid on the top since the base material is transparent. Thus, printed notation such as text in the bottom layer can be viewed without being concealed, even when overlapped from above.

According to the present embodiment, the print head. 7 prints on the cover film 23, and the label-creating device 1 further possesses the pressure rollers 13A and 13B that bond the printed surface of the cover film 23 printed by the print head 7 with the release layer 24 to produce a printed tape T. Accordingly, the label-creating device 1 can create laminate-type print labels L in which the surface printed by the print head 7 is not exposed and, hence, the printed state can be well-preserved.

Variations

While the disclosure has been described in detail with reference to the specific embodiment thereof, it would be apparent to those skilled in the art that various changes and modifications may be made therein without departing from the scope of the invention. In the following variations, like parts and components are designated with the same reference numerals to avoid duplicating description.

When Printing on Pre-Laminated Tape

Label-Creating Device

Figure 18:
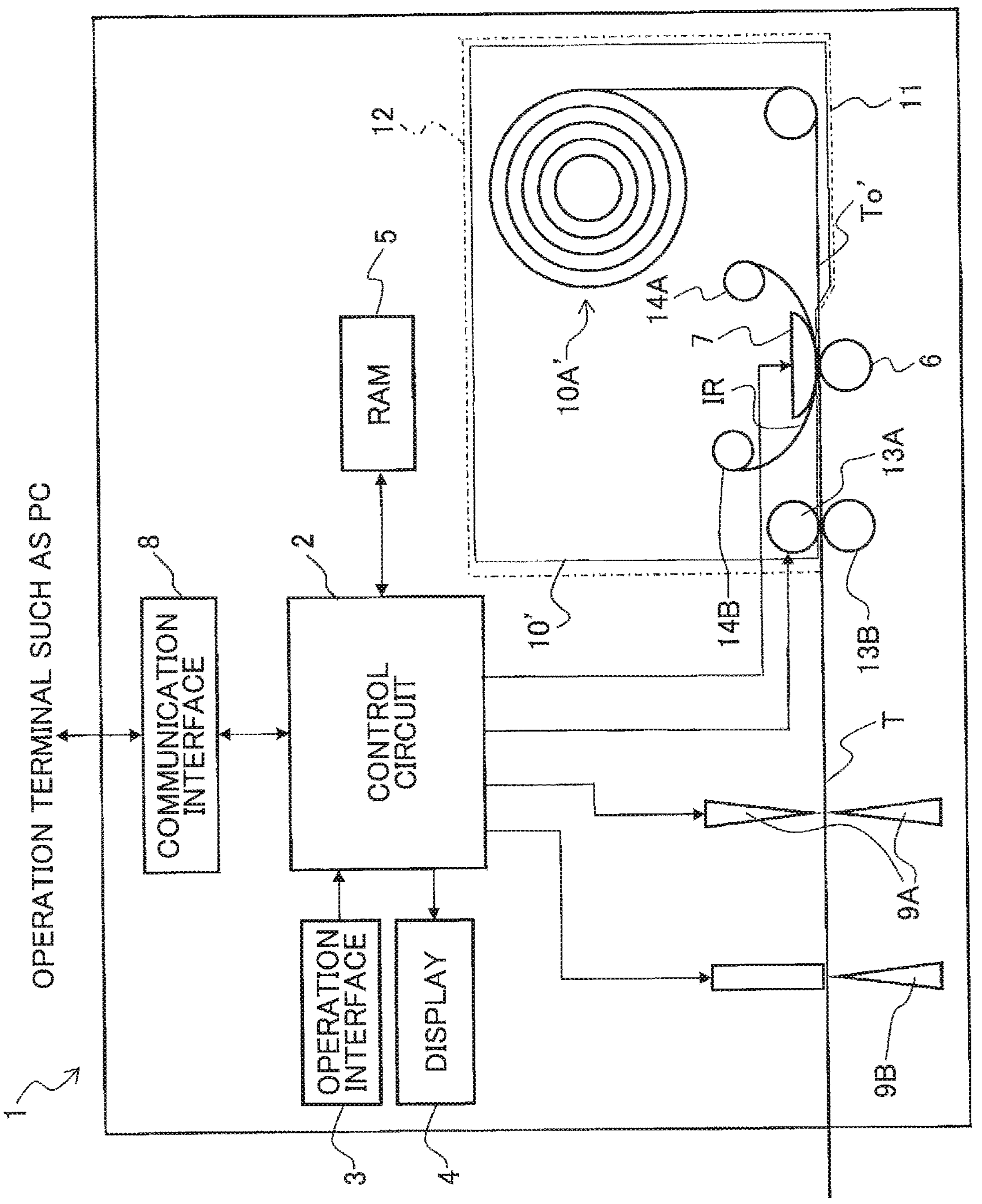
FIG. 18 is an explanatory diagram illustrating functional configuration of label-creating device creating a receptor-type print label.

The functional configuration of the label-creating device in this variation is shown in FIG. 18, which corresponds to FIG. 1 of the embodiment described above.

As shown in FIG. 18, a tape cartridge 10' is mounted in the cartridge holder 12 in place of the tape cartridge 10 in the embodiment described above. The tape cartridge 10' has a tape roll 10A' (depicted in the drawing as concentric circles for simplification but actually wound in a spiral shape) accommodated in the case 11. The tape roll 10A' is formed by winding a tape To' (see FIG. 19A described later) into a roll shape. The tape To' is provided with the base layer 21, the bonding adhesive layer 22, and the release layer 24 (see FIG. 19A described later).

After the tape cartridge 10' is mounted in the cartridge holder 12, the tape To' paid out from the tape roll 10A' is pinched between the conveying roller 6 and the print head 7. The print head 7 prints print objects on the base layer 21 of the tape To' as the tape To' is conveyed by the conveying roller 6, thereby forming the print image R on the surface of the base layer 21, producing the printed tape T' that passes between the pressure rollers 13A and 13B. Subsequently, the printed tape T' is cut by the full cutter 9A to produce a print label L.

Detailed Configuration of the Tape

Figure 19A:
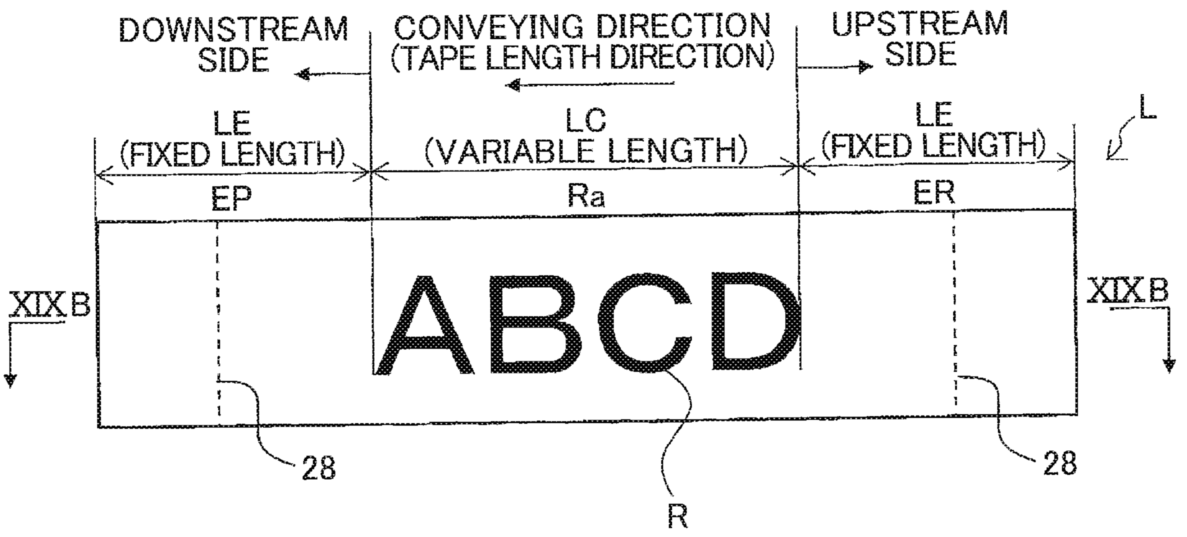
FIG. 19A is a planer diagram of the receptor-type print label.
Figure 19B:
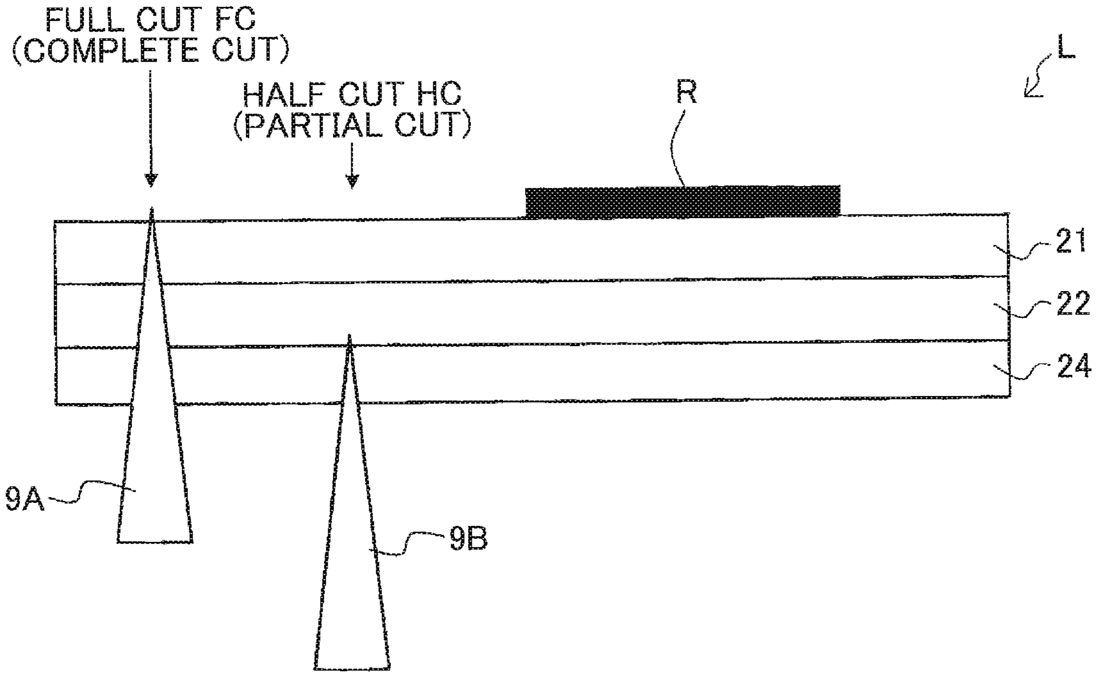
FIG. 19B is a side cross section of the receptor-type print label taken along a plane XIXB-XIXB shown in FIG. 19A.

FIGS. 19A and 19B show a detailed configuration of the tape To' described above. As shown in these drawings, the tape To' of the present variation has the same configuration as the tape To in the embodiment described above but eliminates the cover film 23 and the bonding adhesive layer 26. Further, the release layer 24, the bonding adhesive layer 22, and the base layer 21 are laminated in this order from one side in the thickness direction of the tape (the bottom side in FIG. 19B) toward the other side in the thickness direction (the top side in FIG. 19B).

Similar to the embodiment described above, the print head 7 in this variation also forms the print image R configured of the text “ARCD” on the outer surface of the base layer 21, as illustrated in FIG. 19B. Thus, in the present variation, the printed tape T' is complete after forming the print image R on the outer surface of the base layer 21 since all layers of the tape To' were pre-laminated. Next, the full cutter 9A cuts through all layers of the printed tape T' in the thickness direction, including the release layer 24, the bonding adhesive layer 22, and the base layer 21, to completely detach the printed tape T' in the tape length direction. The half cutter 9B also makes a half cut in the thickness direction of the printed tape T' to cut only the release layer 24 along the tape width direction.

As described above in this variation, the print head 7 prints on the base layer 21 of the tape To' in which the base layer 21 and the release layer 24 are laminated together. Thus, the label-creating device 1 can be used to create receptor-type print labels L when it is desirable to leave the printed surface exposed. Hence, this variation can also produce print labels L that meet diverse needs of users, as in the above embodiment.

The use of such terms as "perpendicular," "parallel," and "flat" in the above description are not intended to be taken in their strictest sense. In other words, the terms "perpendicular," "parallel," and "flat" may signify "substantially perpendicular," "substantially parallel," and "substantially flat" to allow for design and manufacturing tolerances and error.

When dimensions and sizes are described as being "identical," "equivalent," or "different" in appearance in the above description, these terms are not intended to be taken in their strictest sense. In other words, the terms "identical," "equivalent," and "different" may signify "substantially identical," "substantially equivalent," and "substantially different" to allow for design and manufacturing tolerances and error.

However, when describing values used for prescribed criteria or values for divisions, such as threshold values (see the flowcharts in FIGS. 14, 15, 16, and 17) or reference values, such terms as "identical," "equivalent," and "different" should be taken in their strictest sense.

The arrows in FIGS. 1, 18, and other drawings indicate examples of signal flow in the above description, but the directions of signal flow are not limited to these examples.

The flow of procedures are not limited to those shown in the flowcharts of FIGS. 14-17, and may be modified by adding procedures or deleting the procedures, or modifying execution orders of the procedures without departing from the scope or concept of the invention.

In addition to the methods described above, any methods described in the embodiment and variations can be arbitrarily combined.

Though specific examples are not described, various changes and modifications may be made therein without departing from the scope of the invention.

What is claimed is:

1. A print device comprising:

a head configured to perform printing;

a conveyance member configured to convey a tape on which the printing by the head is performed, the tape having a base material and a release material bonded together, the tape including a print portion on which an image is printed by the head, the printed tape being used to create a printed matter;

a half cutter configured to perform a half cut to cut through the release material in a width direction without cutting through the base material;

a full cutter configured to perform a full cut to cut through the tape conveyed by the conveyance member; and a controller configured to control the conveyance member, the head, the half cutter, and the full cutter, wherein the controller is configured to control the half cut so that the half cutter cuts through the release material at a position downstream side of a most downstream end of the print portion of the printed tape, which is conveyed by the conveyance member and is printed by the head, in a conveying direction of the tape; and the print device further comprising:

a first input interface configured to input adherent related information on an adherend to which the printed matter is to be attached, wherein the controller is configured to define one or more cut positions of the tape in the conveying direction as variables and set the one or more cut positions depending on the adherent related information inputted through the first input interface, each of the one or more cut positions indicating a position at which either one of the half cut or the full cut is performed.

2. The print device according to claim 1, wherein the controller is configured to control the half cut so that the half cutter cuts through the release material at a position upstream of a most upstream end of the print portion of the tape, which is conveyed by the conveyance member and is printed by the head, in the conveying direction.

3. The print device according to claim 1, wherein the controller is configured to control the full cut so that the full cutter cuts through the tape at a position upstream of a most upstream end of the print portion of the tape, which is conveyed by the conveyance member and is printed by the head, in the conveying direction.

4. The print device according to claim 1, wherein the one or more cut positions includes two half cut positions each indicating a position at which the half cut is performed, wherein the controller is configured to set the two half cut positions depending on the adherent related information so that a distance between the two half cut positions can be varied.

5. The print device according to claim 4, wherein the first input interface is configured to further input a diameter "ϕ1" of the adherent as the adherent related information, wherein the two half cut positions are arranged in the conveying direction without intervening any full cut position therebetween, wherein the controller is configured to perform a half cut distance setting process to set a distance "L2" between the half cut positions using a rotational gap dimension "g" and a prescribed surplus dimension "s" by $L2=(\phi1+t+g)\times\pi+S$.

6. The print device according to claim 5, further comprising:

a second input interface configured to input a print content; and a display configured to display a screen, wherein the controller is configured to further perform:

a setting process to set a tape length "L1" of the printed material in a longitudinal direction thereof depending on the print content inputted by the second input interface, a determination process to determine whether a value "L1−L2" is greater than or equal to a prescribed threshold value; and an error display process to display on the display an error message indicating that the printed matter cannot be created in a case that the determination process determines that the value "L1−L2" is less than the prescribed threshold value.

7. The print device according to claim 6, wherein the controller is configured to further perform:

setting a first half cut position, a printing area, a second half cut position, and a full cut position to be arranged in the stated order from downstream side to upstream side in the conveying direction, wherein each of the first half cut position and the second half cut position indicates a position at which the half cut is performed, and the full cut position indicates a position at which the full cut is performed, wherein the printing area is an area in which an image is printed.

8. The print device according to claim 7, wherein the controller is configured to further perform:

controlling the conveyance member, the head, the half cut member, and the full cut member to create the printed matter so that:

a distance between a most downstream end of the tape in the conveying direction and the first half cut position is "(L1−L2)/2";

a distance between the first half cut position and the second half cut position is "L2"; and a distance between the second half cut position and the full cut position is "(L1−L2)/2".

9. The print device according to claim 6, wherein the controller is configured to further perform:

setting a first half cut position, a first printing area, a second half cut position, a first full cut position, a third half cut position, a second printing area, a fourth half cut position, and a second full cut position to be arranged in the stated order from downstream side to upstream side in the conveying direction, wherein each of the first half cut position, the second half cut position, the third half cut position, and the fourth half cut position indicates a position at which the half cut is performed, and each of the first full cut position and the second full cut position indicates a position at which the full cut is performed, wherein each of the first printing area and the second printing area is an area in which an image is printed.

10. The print device according to claim 9, wherein the controller is configured to further perform:

controlling the conveyance member, the head, the half cut member, and the full cut member to create the printed matter so that:

a distance between a most downstream end of the tape in the conveying direction and the first half cut position is "(L1−L2)/2";

a distance between the first half cut position and the second half cut position is "L2";

a distance between the second half cut position and the first full cut position is "(L1−L2)/2";

a distance between the first full cut position and the third half cut position is "(L1−L2)/2";

a distance between the third half cut position and the fourth half cut position is "L2"; and a distance between the fourth half cut position and the second full cut position is "(L1−L2)/2".

11. The print device according to claim 1, wherein the one or more cut positions includes a half cut position at which the half cut is performed and a full cut position at which the full cut is performed, wherein the controller is configured to set the half cut position and the full cut position depending on the adherent related information so that a distance between the half cut position and the full cut position can be varied.

12. The print device according to claim 1, wherein the controller is configured to further perform:

setting a first half cut position, a first printing area, a second half cut position, a third half cut position, a second printing area, a fourth half cut position, and a full cut position to be arranged in the stated order from downstream side to upstream side in the conveying direction, wherein each of the first half cut position, the second half cut position, the third half cut position, and the fourth half cut position indicates a position at which the half cut is performed, and the full cut position indicates a position at which the full cut is performed, wherein each of the first printing area and the second printing area is an area in which an image is printed.

13. The print device according to claim 12, wherein the one or more cut positions includes two half cut positions each indicating a position at which the half cut is performed, wherein the first input interface is configured to further input a diameter "ϕ1" of the adherent and a distance "LL" as the adherent related information, wherein the base material has a back surface, two sections of the back surface of the base material are to be bonded by folding the tape, and a length of the each of the two sections being to be bonded is equivalent to the distance "LL", wherein the two half cut positions are arranged in the conveying direction without intervening any full cut position therebetween, wherein the controller is configured to perform a half cut distance setting process to set a distance "L2" between the two half cut positions using a rotational gap dimension "g" and a prescribed surplus dimension "s" by $L2=(\phi 1+t+g)\times\pi+s\times 2+LL\times 2$.

14. The print device according to claim 13, further comprising:

a second input interface configured to input a print content; and a display configured to display a screen, wherein the controller is configured to further perform:

a setting process to set a tape length "L1" of the printed material in a longitudinal direction thereof depending on the print content inputted by the second input interface;

a determination process to determine whether a value "L1−L2" is greater than or equal to a prescribed threshold value; and an error display process to display on the display an error message indicating that the printed matter cannot be created in a case that the determination process determines that the value "L1−L2" is less than the prescribed threshold value.

15. The print device according to claim 14, wherein the controller is configured to further perform:

controlling the conveyance member, the head, the half cut member, and the full cut member to create the printed matter so that:

a distance between a most downstream end of the tape in the conveying direction and the first half cut position is "(L1−L2)/2";

a distance between the first half cut position and the second half cut position is "$(\phi 1+t+g)\times\pi/2+s$";

a distance between the second half cut position and the third full cut position is "LL×2";

a distance between the third half cut position and the fourth half cut position is "$(\phi 1+t+g)\times\pi/2+s$"; and a distance between the fourth half cut position and the full cut position is "(L1−L2)/2".

16. The print device according to claim 1, wherein the controller is configured to further perform:

setting a first half cut position, a first printing area, a second printing area, a second half cut position, and a full cut position to be arranged in the stated order from downstream side to upstream side in the conveying direction, wherein each of the first half cut position and the second half cut position indicates a position at which the half cut is performed, and the full cut position indicates a position at which the full cut is performed, wherein each of the first printing area and the second printing area is an area in which an image is printed.

17. The print device according to claim 16, wherein the first input interface is configured to further input a distance "X1" and a distance "X2" as the adherent related information, the distance "X1" indicating a distance between a most downstream end of the tape and the first half cut position and the distance "X2" indicating a distance between the second half cut position and the full cut position.

18. The print device according to claim 17, wherein the controller is configured to further perform:

a determination process to determine whether the inputted distance "X1" is greater than or equal to a prescribed downstream gap dimension, the prescribed downstream gap dimension being set as a prescribed value of a downstream gap dimension which is used to define arrangement of the first printing area in the tape; and either one of an error display process and a correction process in a case that the determination process determines that the inputted distance "X1" is greater than or equal to the prescribed downstream gap dimension, the error display process being to display on the display error message indicating that the printed matter cannot be created, the correction process being to correct the downstream gap dimension to be greater than or equal to the inputted distance "X1".

19. The print device according to claim 17, wherein the controller is configured to further perform:

a determination process to determine whether the inputted distance "X2" is greater than or equal to a prescribed upstream gap dimension, the prescribed upstream gap dimension being set as a prescribed value of an upstream gap dimension which is used to define arrangement of the second printing area in the tape; and either one of an error display process and a correction process in a case that the determination process determines that the inputted distance "X2" is greater than or equal to the prescribed downstream gap dimension, the error display process being to display on the display error message indicating that the printed matter cannot be created, the correction process being to correct the upstream gap dimension to be greater than or equal to the inputted distance "X2".

20. The print device according to claim 17, further comprising:

a second input interface configured to input a print content; and wherein the controller is configured to further perform:

a setting process to set a tape length "L1" of the printed material in a longitudinal direction thereof depending on the print content inputted by the second input interface;

a half cut distance setting process to set a distance "L2" between the first half cut position and the second half cut position by L2=L1−X1−X2; and controlling the conveyance member, the head, the half cut member, and the full cut member to create the printed matter so that:

a distance between a most downstream end of the tape in the conveying direction and the first half cut position is the distance "X1";

a distance between the first half cut position and the second half cut position is the distance "L2"; and a distance between the first half cut position and the full cut position is the distance "X2".

21. The print device according to claim 1, wherein the conveyance member is configured to convey the tape having the base material on which an image is printed and the release material bonded to the base material.

22. The print device according to claim 1, wherein the head is configured to print an image on a cover film, the print device further comprising:

a bonding member configured to bond the base material with the cover film on which the image is printed to create the tape.

23. The print device according to claim 1, wherein the head is configured to print an image on the base material to which the release material is already bonded.

* * * * *